US010414638B2

(12) United States Patent
Munuswamy et al.

(10) Patent No.: US 10,414,638 B2
(45) Date of Patent: Sep. 17, 2019

(54) LIGHTWEIGHT FLEXIBLE TENSIONING SYSTEM FOR CONSTRUCTION EQUIPMENT

(71) Applicant: Manitowoc Crane Companies, LLC, Manitowoc, WI (US)

(72) Inventors: Arumugam Munuswamy, Hagerstown, MD (US); Marius Fangnang Keunda, Wilhelmshaven (DE)

(73) Assignee: Manitowoc Crane Companies, LLC, Manitowoc, WI (US)

(*) Notice: Subject to any disclaimer, the term of this patent is extended or adjusted under 35 U.S.C. 154(b) by 488 days.

(21) Appl. No.: 14/784,010

(22) PCT Filed: Dec. 30, 2014

(86) PCT No.: PCT/US2014/072697

§ 371 (c)(1),
(2) Date: Oct. 12, 2015

(87) PCT Pub. No.: WO2015/103223

PCT Pub. Date: Jul. 9, 2015

(65) Prior Publication Data

US 2016/0221805 A1 Aug. 4, 2016

Related U.S. Application Data

(60) Provisional application No. 61/922,055, filed on Dec. 30, 2013.

(51) Int. Cl.
*B66C 23/06* (2006.01)
*B66C 23/82* (2006.01)
(Continued)

(52) U.S. Cl.
CPC ............ *B66C 23/821* (2013.01); *B66C 23/06* (2013.01); *B66C 23/62* (2013.01); *D07B 1/18* (2013.01)

(58) Field of Classification Search
CPC ....... B66C 23/06; B66C 23/62; B66C 23/821; D07B 1/18
See application file for complete search history.

(56) References Cited

U.S. PATENT DOCUMENTS 2,495,951 A * 1/1950 Von Wehrden ....... F16G 11/146 294/74
2,972,199 A * 2/1961 Learmont ................. E02F 3/48 212/262

(Continued)

FOREIGN PATENT DOCUMENTS

CN 101618840 A 1/2010
CN 101641532 A 2/2010

(Continued)

OTHER PUBLICATIONS

International Search Report for International Application No. PCT/US2014/072697, dated Apr. 3, 2015 (3 pages).

(Continued)

*Primary Examiner* — Emmanuel M Marcelo
(74) *Attorney, Agent, or Firm* — Levenfeld Pearlstein, LLC

(57) ABSTRACT

Components and systems for a flexible tensioning member for construction equipment. A tensioning member is comprised of a fiber having a specific tensile strength greater than 1,000 kilonewton meters per kilogram. The tensioning member connects two components and has an attachment allowing the tensioning member to flex relative to a component. The attachment may provide a system for connecting multiple tensioning members.

19 Claims, 20 Drawing Sheets

(51) Int. Cl.
*B66C 23/62* (2006.01)
*D07B 1/18* (2006.01)

(56) References Cited

U.S. PATENT DOCUMENTS

| | | | | |
|---|---|---|---|---|
| 4,061,388 | A | 12/1977 | Wilkinson | |
| 4,097,083 | A | 6/1978 | Schwartz | |
| 4,699,395 | A | 10/1987 | Hale | |
| 5,016,026 | A * | 5/1991 | Flory | B63B 21/00 177/147 |
| 5,269,129 | A * | 12/1993 | Lundy | B63B 21/20 474/207 |
| 6,120,074 | A * | 9/2000 | Hamrick | F16G 11/146 294/74 |
| 7,399,018 | B1 * | 7/2008 | Khachaturian | B66C 1/12 294/74 |
| 7,537,126 | B2 | 5/2009 | Kurotsu et al. | |
| 8,256,981 | B2 * | 9/2012 | Lindsey | B66C 1/12 294/74 |
| 2010/0072155 | A1 * | 3/2010 | Foust | B66C 23/365 212/175 |
| 2011/0265442 | A1 * | 11/2011 | Segura | B66C 1/10 59/86 |
| 2012/0305312 | A1 * | 12/2012 | McCullough | F16G 11/02 174/75 R |
| 2017/0356133 | A1 * | 12/2017 | Campbell | D07B 1/02 |

FOREIGN PATENT DOCUMENTS

| | | | |
|---|---|---|---|
| CN | 203306910 | U | 11/2013 |
| JP | S54139163 | U | 9/1979 |
| JP | S56112191 | U | 8/1981 |
| JP | H0428632 | B2 | 5/1992 |
| JP | 2006349183 | A | 12/2006 |
| JP | 2014218337 | A | 11/2014 |
| WO | WO 2008/089798 | A1 | 7/2008 |

OTHER PUBLICATIONS

Written Opinion for International Application No. PCT/US2014/072697, dated Apr. 3, 2015 (15 pages).

First Office Action and English translation from related Chinese Application No. 201480024416.5, dated Jun. 2, 2016 (25 pages).

* cited by examiner

LIGHTWEIGHT FLEXIBLE TENSIONING SYSTEM FOR CONSTRUCTION EQUIPMENT

REFERENCE TO EARLIER FILED APPLICATION

This application is a 371 national phase of PCT/US2014/072697, filed Dec. 30, 2014, and claims the benefit under 35 U.S.C. § 119(e) of U.S. Provisional Patent Application No. 61/922,055, filed Dec. 30, 2013, and titled "LIGHT-WEIGHT FLEXIBLE TENSIONING SYSTEM FOR CONSTRUCTION EQUIPMENT," which is incorporated, in its entirety, by this reference.

BACKGROUND

1. Technical Field Text

Embodiments of the invention are directed to flexible tensioning members for a crane system and more particularly to a flexible crane tensioning member and connection assemblies.

2. Background Information

Large cranes are typically transported to a job site over the highway for at least a portion of the journey to a job site. Because many countries, states or other geopolitical entities impose limitations on the weight of vehicles (sometimes on a per-axle basis) that can be driven on highways within their jurisdiction, a large crane is typically broken into smaller pieces for transport. Once delivered to the job site, the crane is assembled from the smaller pieces. Some cranes, often referred to as mobile hydraulic cranes, are mounted on multi-axle transport carriers and are designed to travel over the highway and be ready for use at the job site with minimal set-up activity. However, to reduce the number of axles, there is a considerable benefit in reducing the weight of the crane, or transporting parts of the crane on a separate carrier to the job site.

Large cranes typically use a bracing structure to strengthen components of a crane such as a boom, jib, and mast. For example, a crane's boom may not be strong enough on its own to support the bending forces it is subject to when carrying a large load suspended from the tip of the boom. Rather than increase the cross section of the boom, which adds significantly to its weight, it is common to use a bracing structure to increase the stiffness and load capacity of the boom. The bracing structure typically includes at least one tensioning member under tension that extends from a location lateral of the boom to a location on the boom forming a triangle. The lateral location may be a strut coupled to the boom, or it may be a location offset from the boom on another structure of the crane.

In larger cranes the bracing structure itself may be relatively large and heavy. In some instances the bracing structure may require the use of another crane to lift it into place. In other instances, the bracing structure may be formed from smaller individual piecing connected together. These smaller individual pieces may be assembled in place on the crane, or assembled off of the crane and then attached to the crane as a single unit.

The individual pieces are typically formed from high tensile strength steel. In order for a worker to assembly the bracing structure, the individual pieces are typically no larger than a size that the workers can easily manipulate. Additionally, different cranes options may require different lengths of bracing structures or different strengths. For example, a boom may be extendable and require different lengths of bracing depending upon the extent that the boom is extended. For this reason a given crane configuration may have a specific set of bracing pieces associated with it.

FIG. 1 illustrates an example of a current tensioning member 100 made of high tensile strength steel. The tensioning member 100 is rigid with a high modulus of elasticity, such that any movement at one end of the tensioning member 100 is translated to the other end of the tensioning member 100. The tensioning member 100 may be joined end to end with another tensioning member to span a distance greater than a length 104 of the individual tensioning member 100. Tensioning member 100 has an eye 102 formed at one end of the tensioning member 100. The eye 102 is used to connect the tensioning member 100 to another component. For example, a pin may extend through the eye 102 and another component, fastening them together.

Because the tensioning member 100 is rigid, any movement between the tensioning member 100 and a crane must be accounted for. If the tensioning member 100 were rigidly attached to the crane, the tensioning member 100 would develop torsional loads in addition to a tension load and would likely experience a structural failure.

In some cranes the bracing structure may include steel cables as tensioning members. Steel cables are advantageous in some applications because they may be wound for storage and a single cable may be used to span a large distance. Additionally, steel cables are more forgiving in their attachment than sold cross section tensioning members 100 because they have some degree of flexibility. However, steel cables are typically not as strong as a solid cross section tensioning members 100 and therefore are not able to be used in all situations.

Tensioning members 100 and cables have been used successfully and continue to be used successfully in cranes. They are strong, readily available, and familiar to the operator. However, it would be beneficial to have a simpler system to replace the various combinations of tensioning members 100 and steel cables that offered similar strength while allowing for simple connection mechanisms.

BRIEF SUMMARY

Embodiments of the invention are directed to a flexible tensioning member. The flexible tension member includes a middle portion, a first end and a second end. The middle portion comprises a bundle of fibers having a specific tensile strength greater than 1,000 kilonewton meter per kilogram. The first end is connected to the middle portion and has a first connector. The second end is connected to the middle portion and comprises a first member extending axially and laterally from the middle portion and a second member extending axially and laterally from the middle portion and laterally from the first member. The first member has a second connector and the second member has a third connector.

In another embodiment of the invention, the flexible tensioning member has a cross pin disposed between first member and the second member. The cross pin has a first pin end and a second pin end. The second connector is sized and shaped to receive the first pin end and the third connector is sized and shaped to receive the second pin end.

In another embodiment of the invention a crane static tensioning assembly includes a flexible tensioning member, a shank, and a pivot joint. The flexible tensioning member comprises fibers having a specific tensile strength greater than 1,000 kilonewton meter per kilogram. The shank has a bore shaped and sized to receive a pivot spindle. The pivot joint has a first connector coupled to the flexible tensioning member and a second connector coupled to the shank.

In another embodiment of the invention a flexible tension member attachment assembly includes a base, a connector, a plurality of bores, and a rope. The base has a base end and a top end and the connector is disposed at the top end. A plurality of bores extends from the base end towards the top end. The rope having a first portion disposed in a first bore and a second portion disposed in a second bore.

In another embodiment of the invention a crane tensioning assembly includes a connection block, a flexible tensioning member, and a pin. The connection block has a plurality of cavities each sized and shaped to receive an end of a flexible tensioning member. The connection block has a first bore extending through a first cavity from among the plurality of cavities. The flexible tensioning member has an eye at a first end of the flexible tensioning member and is positioned in a cavity from among the plurality of cavities with the eye having a centerline coaxial with a centerline of the first bore. The pin is disposed in the first bore and extends through the eye.

In another embodiment of the invention, a boom assembly comprises a boom, a mast, and a flexible tensioning member. In another embodiment the boom assembly comprises a boom, a mast, and a crane static tensioning assembly. In another embodiment, the boom assembly comprises a boom, a mast, and the flexible tension member attachment assembly.

DETAILED DESCRIPTION OF THE DRAWINGS AND THE PRESENTLY PREFERRED EMBODIMENTS

Throughout this description reference will be made to the specific tensile strength of a material. The specific tensile strength of a material is the tensile strength of the material divided by its density. It may also be known as the strength to weight ratio. In this application, the specific tensile strength of a material will be denoted in the units of kilonewton meters per kilogram. As an example, aluminum has a tensile strength of about 600 megapascals (MPa) and a density of about 2.8 grams per cubic centimeter. It would therefore have a specific strength of about 214 kilonewton meters per kilogram.

Throughout this description reference will be made to fibers. The term fibers will be used in its conventional sense to mean a thin filament. Fibers may be naturally occurring such as spider silk, or they may be synthetic. Fibers may be bundled together to form a larger component. The strength of the component will typically depend on the orientation of the fibers. Fibers have their greatest strength in a longitudinal direction and have very little strength in other directions. Therefore, if all the fibers are aligned in a single direction, the component will have its greatest strength in the direction of the fibers and may be flexible in other directions. When fibers are twisted or braided together they may form a rope. The rope has little resistance to bending and it is useful primarily as a tensioning component.

Some embodiments of the invention are directed toward the use of high strength rope in place of steel cables and steel tensioning members. The high strength rope is formed of high specific tensile strength fibers formed into yarns. The yarns are then twisted into strands which are woven, twisted, or braided together to form the rope. The strands may be formed of a blend of fibers such as aramid fibers and high modulus polyethylene. The strands may each be coated by an abrasion resistant coating such as polyurethane prior to forming the rope. An outer jacket may be used to protect the fibers from ultraviolet light and foreign matter. The braiding and twisting of the outer stands may be balance such that half of the strands are twisted in one direction while the remaining half is twisted in the opposite direction to obtain torque neutrality. The fibers may be chosen to minimize creep within the rope. However, some creep may be inevitable and the use of a length adjustment system may be necessary. For example, a turn buckle may be used to compensate for any stretching or creep of the rope.

Figure 1:
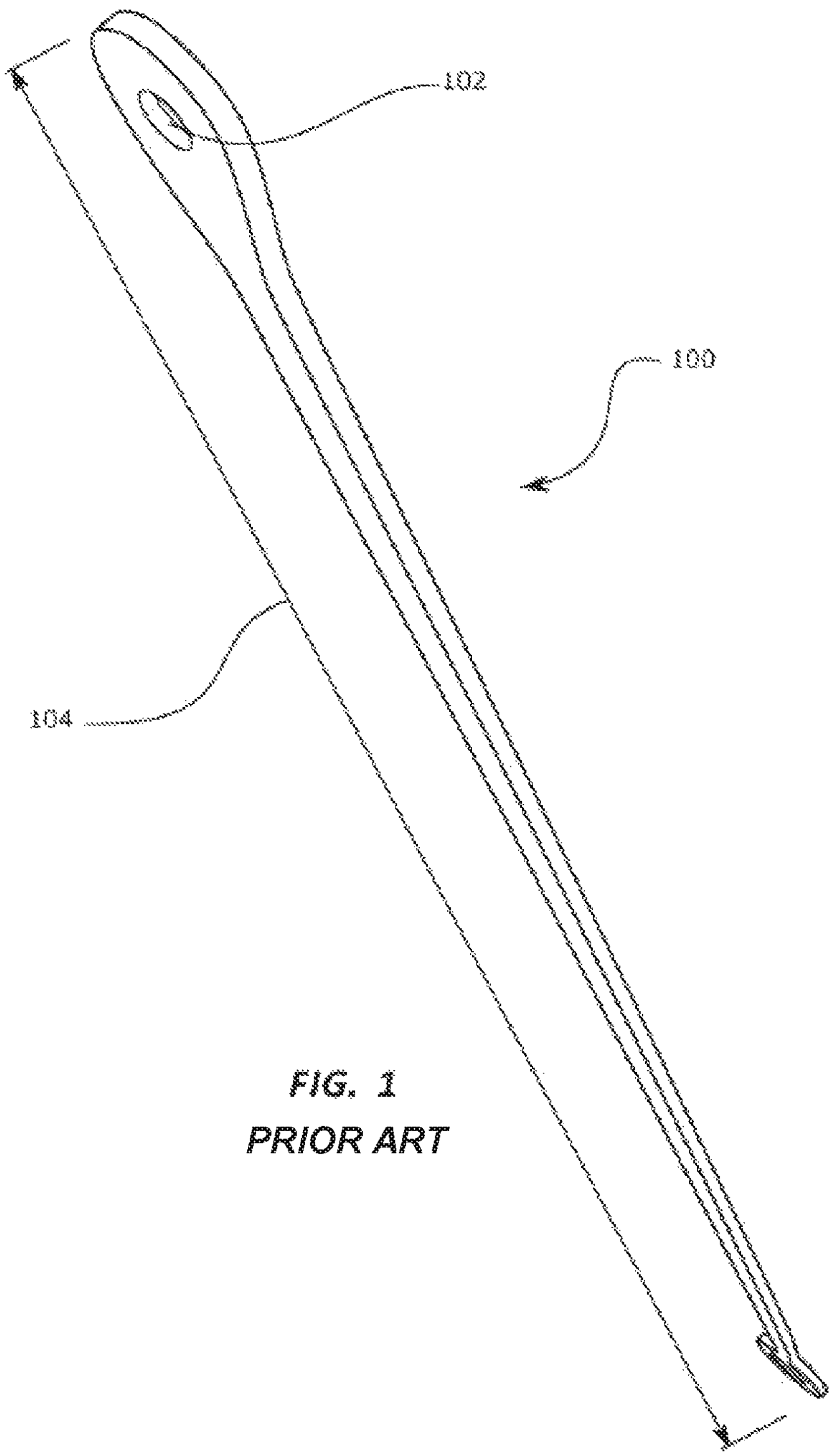
FIG. 1 PRIOR ART
FIG. 1 depicts an example of a prior art steel tie rod end used as a static support member.
Figure 2:
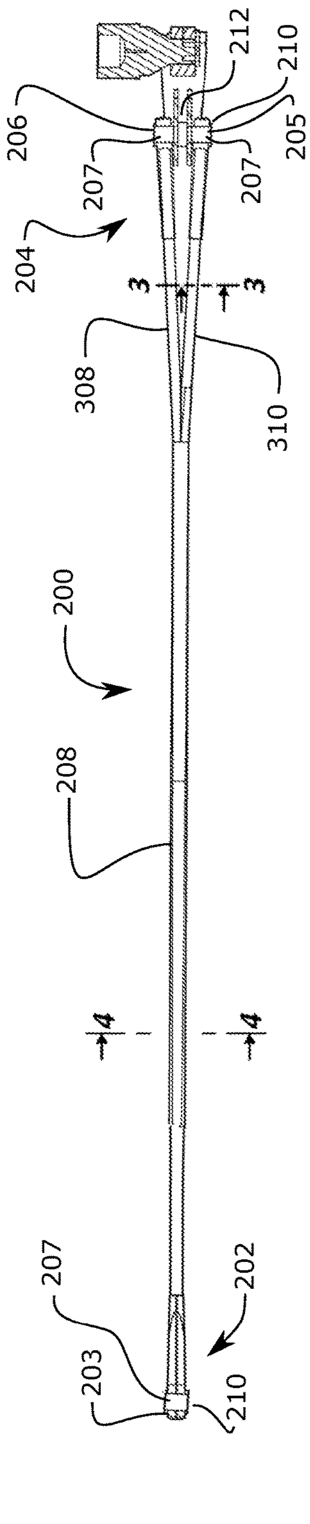
FIG. 2 depicts an embodiment of a flexible tensioning member of the present invention.
Figure 3:
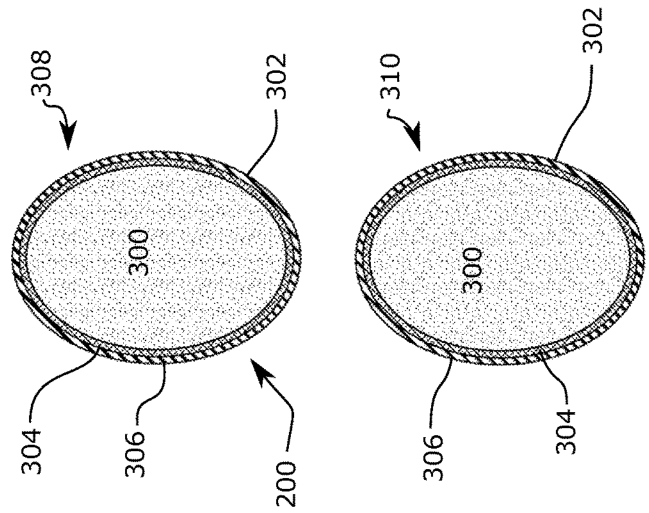
FIG. 3 depicts a cross section taken across section 3-3 at an end of the flexible tensioning member of FIG. 2
Figure 4:
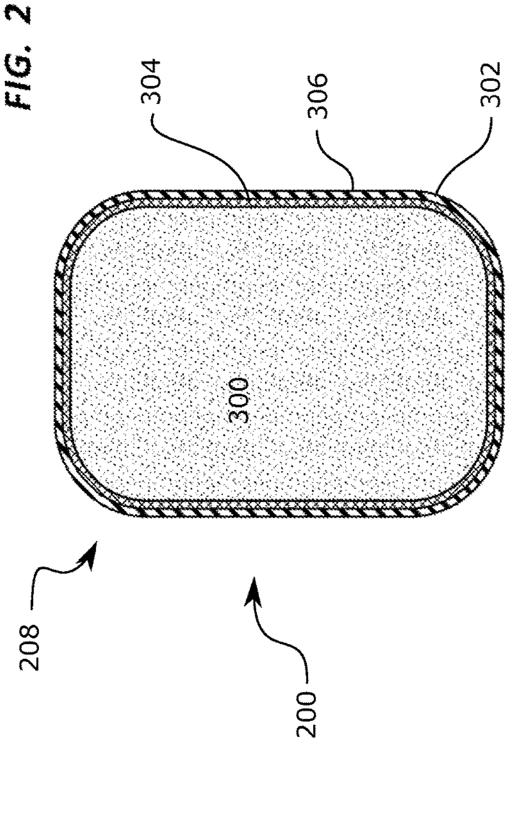
FIG. 4 depicts a cross section taken across section 4-4 of a middle portion of the flexible tensioning member of FIG. 2.

FIG. 2 illustrates an embodiment of a flexible tensioning member 200 in accordance with an embodiment of the present invention. The flexible tensioning member 200 may be used as a replacement to the tensioning member 100 shown in FIG. 1 and may be used as a tensioning member in the embodiments of FIGS. 17 through 20. As shown in FIG. 3 and FIG. 4, the flexible tensioning member 200 is comprised of a bundle of fibers 300 covered by jacket 302.

The bundle of fibers 300 is comprised of a fiber having a high specific tensile strength. In one embodiment, poly(p-phenylene-2,6-benzobisoxazole) (hereinafter PBO), commercially available as Zylon®, is used as a fiber. PBO is a synthetic fiber having a specific tensile strength of about 3766 kilonewton meters per kilogram. It is additionally advantageous as it has a high modulus of elasticity and therefore stretches very little under load. Furthermore, it experiences little creep after repeated usage. The bundle of fibers 300 are orientated longitudinally and may be formed using a single fiber continuous winding process. In the process, bushings 206 are set at positions corresponding to a desired configuration. A fiber is then wrapped around the bushings 206 to form the bundle of fibers 300. Because the width of a single fiber may be 20 micrometers or less, the fiber may be wrapped around the bushings 206 thousands of times or more.

In embodiments of the present invention, the fiber is wrapped around at least three bushings 203, 205 and 206, 203 being at a first end 202 of the flexible tensioning member 200, and 205 and 206 being at a second end 204 of the flexible tensioning member 200. The fiber may alternate winding between bushing 203 and 205 and then between bushings 203 and 206. In other embodiments, the single fiber may be wrapped around four bushings with two bushings at each end of the flexible tensioning member. See FIG. 5, discussed below. After winding, the bushings 203, 205 and 206 may be left in place in the flexible tensioning member 200 to provide a connector 210. The bushings 203, 205 and 206 may have an eye 207 for connection to another component. In some embodiments the bushing 203, 205, and 206 may be a high strength pin that extends laterally from the flexible tensioning member 200 for connection to another component.

The jacket 302 protects the bundle of fibers 300 from abrasion, moisture, and ultraviolet (UV) light. Preferably the jacket 302 is cut resistant, moisture resistant, and UV resistant. To perform all of these functions, the jacket 302 may be comprised of multiple layers. In the embodiment of FIGS. 3 and 4, the jacket 302 is comprised of a braided layer 304 and an outer layer 306. The braided layer 304 may be formed of a cut resistant fiber, such as Kevlar®. The outer layer 306 may comprise an elastomeric coating such as polyurethane. Additionally, the ends 202, 204 of the flexible tensioning member 200 may be covered with an additional material shaped to an end termination. For example, a polyurethane foam may cover an end of the flexible tensioning member 200 and be shaped to retain the bushings 203, 205 and 206. Other configurations of materials are possible and the jacket 302 may be comprised of a single layer of material or multiple layers. Additionally, the composition of the jacket 302 may vary between the cross section of FIG. 3 and the cross section of FIG. 4.

The cross section of FIG. 3 illustrates a cross-section in which the flexible tensioning member 200 has separated into a first member 308 and a second member 310, both extending away axially and laterally from a middle portion 208 of the flexible tensioning member 200. The first member 308 and the second member 310 are comprised of the same bundle of fibers 300 as the middle portion 208 separated into two portions for the first and second members 308, 310. FIG. 4 illustrates a cross-section of the middle portion 208 of the flexible tensioning member 200. The bundle of fibers 300 within the middle portion 208 extend into the first and second members 308, 310 such that the number of fibers in the middle portion 208 equals the number of fibers in the first and second members 308, 310 combined.

Returning to FIG. 2, the first end 202 of the flexible tensioning member 200 has a connector 210 for connection to another component. The connector 210 may be coupled to the bushing 203, 205, and 206 or it may be the bushing 203, 205 and 206 itself. For example, the bushing 206 may have an eye 207 through which a bolt or pin may be placed. In this example, the eye 207 would be considered to be the connector 210.

A second end 204 of the flexible tensioning member 200 has the first member 308 extending axially and laterally away from the middle portion 208 and a second member 310 extending axially and laterally away from the middle portion 208. The first member 308 and the second member 310 each have a connector 210 for connection to another component. The connectors 210 may be the same style as the connector 210 at the first end 202 of the flexible tensioning member 202. For example, the connector 210 at the first end 202 may be a bushing 208 with an eye 207 and the connectors 210 on the first and second members 308, 310 may also be bushings 208 having an eye 207. In other embodiments the connectors 210 of the first and second members 308, 310 may be a different style than the connectors 210 on the first end 202 of the flexible tensioning member 200. For example, the connector 210 at the first end 202 may comprise a pin bushing and the connectors 210 at the second end may comprise bushings having an eye 207. In some embodiments the bushings 206 on the first and second member 308, 310 may be sized and shaped to receive a pin connector at the first end 202.

Spacing the connectors 210 of the first member 308 and second member 310 allows the flexible tensioning members 200 to be connected end to end with a single pin extending through an eye 207 of the first member 208 and second member 210 and an eye of the first end 202. The spacing further allows stresses to be distributed over a wider area than a single connector.

The jacket 302 may bias the first member 308 and the second member 310 towards one another. A spacer 212 may be disposed between the connectors 210 at the first and second members 308, 310. The spacer 212 keeps the first member 308 and second member 310 at a fixed distance apart.

Figure 5:
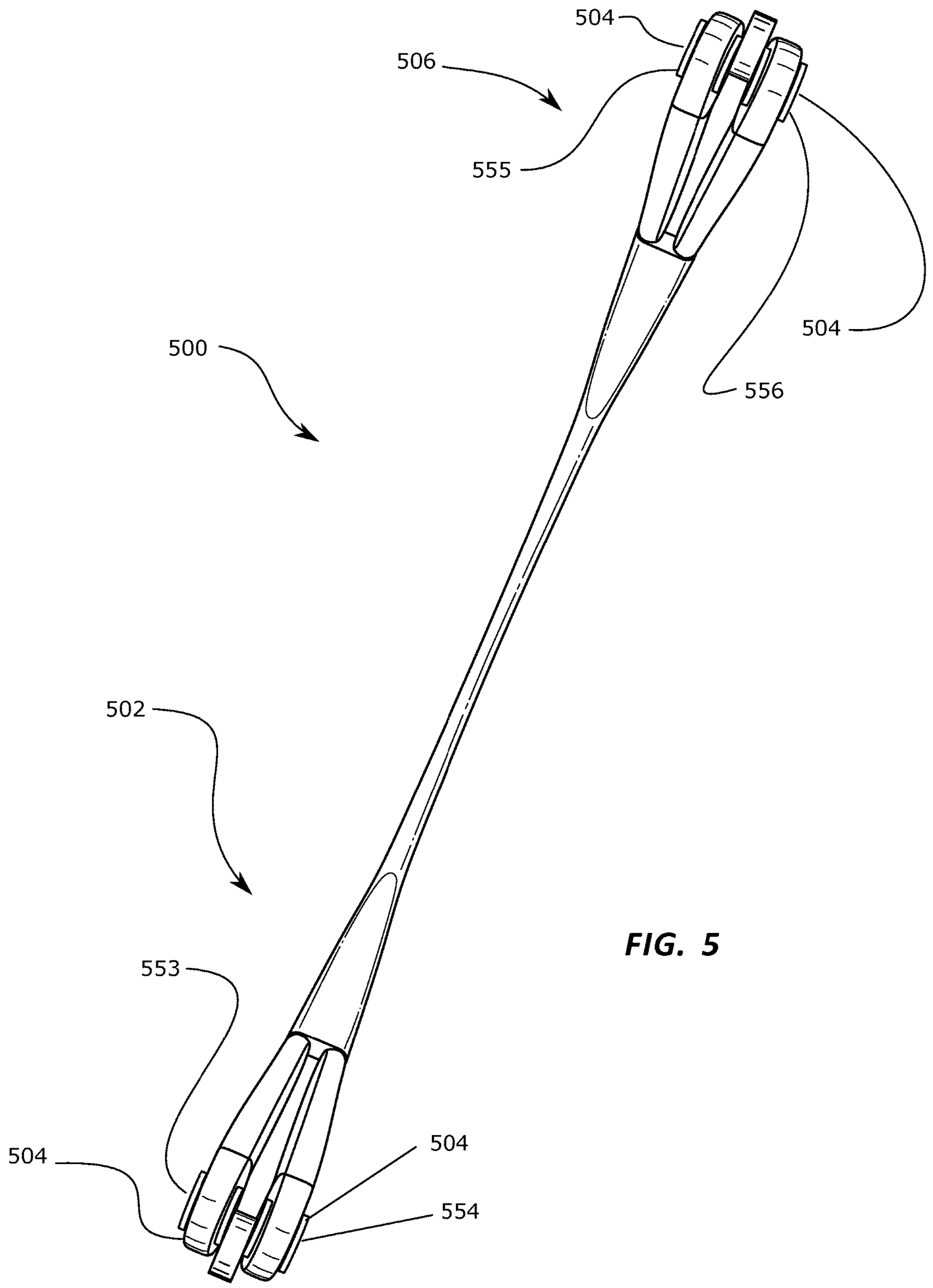
FIG. 5 depicts an embodiment of a flexible tensioning member having two split ends.

FIG. 5 illustrates another embodiment of a flexible tensioning member 500. The embodiment of FIG. 5 is similar to the embodiment of FIG. 2 with the exception that a first end 502 of the flexible tensioning member 500 has two connectors 504 and a second end 506 of the flexible tensioning member 500 also has two connectors 504. The first end 502 and the second end 506 may be identical in some embodiment but they need not be. The embodiment of FIG. 5 is similar in construction to the embodiment of FIG. 2 with the exception that the fiber is wound around four bushings instead of three. For example, the fiber is alternately wound between a first bushing 553 on the first end and a first bushing 555 on the second end, the first bushing 553 on the first end and the second bushing 556 on the second end, the second bushing 554 on the first end and the first bushing 555 on the second end, and the second bushing 554 on the first end and the second bushing 556 on the second end. Because the flexible tensioning member 500 is lighter than a comparable steel tensioning member 100, it may span a greater distance and not require the use of members joined end to end. In such embodiments, it may be advantageous for both ends to have connectors spaced apart to distribute the stress.

Figure 6:
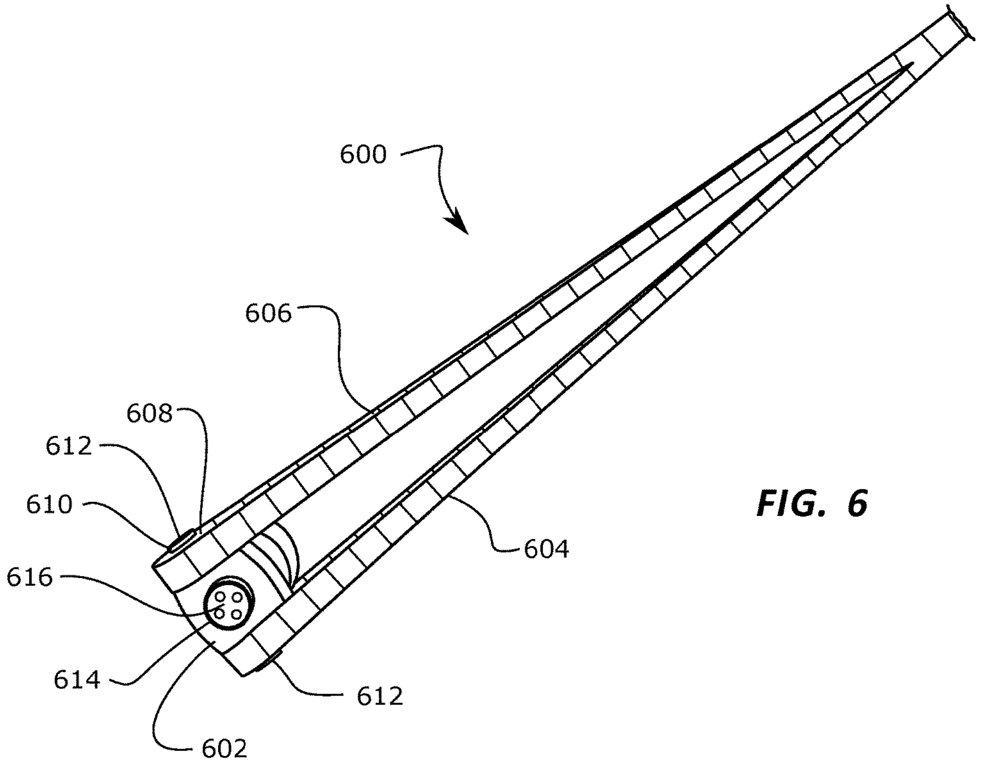
FIG. 6 depicts an embodiment of a flexible tensioning member coupled to a pivot spindle through a cross-pin.

FIG. 6 illustrates an embodiment of a flexible tensioning member 600 combined with a cross pin 602 disposed between a first member 604 and a second member 606. In this embodiment, a bushing 608 having an eye 610 is disposed in the first and second member 604, 606. The eyes 610 are each sized and shaped to receive a pin end 612 of the cross pin 602. The pin ends 612 are fitted in the eyes 610 of the bushings 608 such that the cross pin 602 is positioned between the first member 604 and the second member 606. In some embodiments the cross pin 602 may have a retainer constraining the pin ends 612 in the bushings 608. For example, a pin end 612 may extend through a bushing 608 and have a retaining clip disposed on it preventing the cross pin 602 from retracting into the bushing 608.

The cross pin 602 may have a bore 614 disposed between the pin ends 612. The bore 614 may be disposed orthogonal to an axis of the pin ends 612. The bore 614 is sized and shaped to receive a pivot spindle 616. The cross pin 602 may be secured to the pivot spindle 616 use conventional techniques such as retaining clips, locking collars, bolts, and other techniques as known in the art. This embodiment enables the flexible tensioning member 600 to rotate about the pivot spindle 616 in three axes using only two joints. The cross pin 602 may pivot around the pivot spindle 616, the flexible tensioning member 600 may pivot around the pin ends 612 of the cross pin 602, and the flexible tensioning member 600 itself may twist along its own axis.

Figure 7:
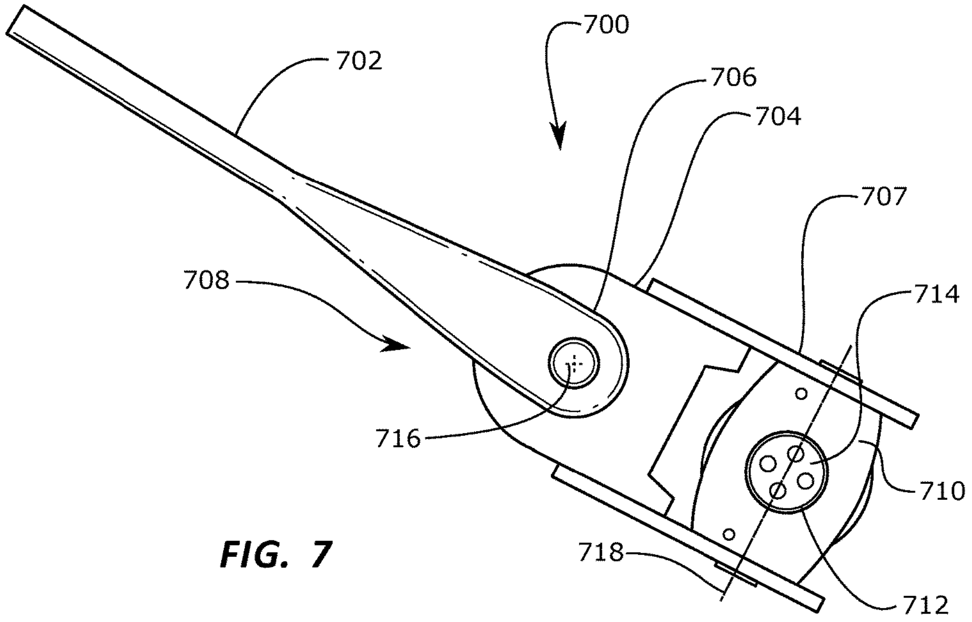
FIG. 7 depicts an embodiment of a flexible tensioning member coupled to a pivot spindle through a pivot joint.

FIG. 7 illustrates one end of an embodiment of a flexible tensioning assembly 700. The flexible tensioning assembly 700 has a flexible tensioning member 702 formed of fibers having a specific strength greater than 1,000 kilonewton meter per kilogram. A pivot joint 704 has a first connector 706 connected to an end 708 of the flexible tensioning member 702 and a second connector 707 connected to a shank 710. The shank 710 has a bore 712 sized and shaped to receive a pivot spindle 714. The first connector 706 may enable rotation of the flexible tensioning member 702 relative to the pivot joint 704 about a first axis 716 and the second connector 707 may enables rotation of the flexible tensioning member 702 about a second axis 718 orthogonal to the first axis 716. In the embodiment of FIG. 7, the flexible tensioning member 702 may be the flexible tensioning member 200 described in relation to FIG. 2. In such embodiments the connectors 210 of the first member 308 and second member 310 may connect the flexible tensioning member 702 to the pivot joint 704.

Figure 8:
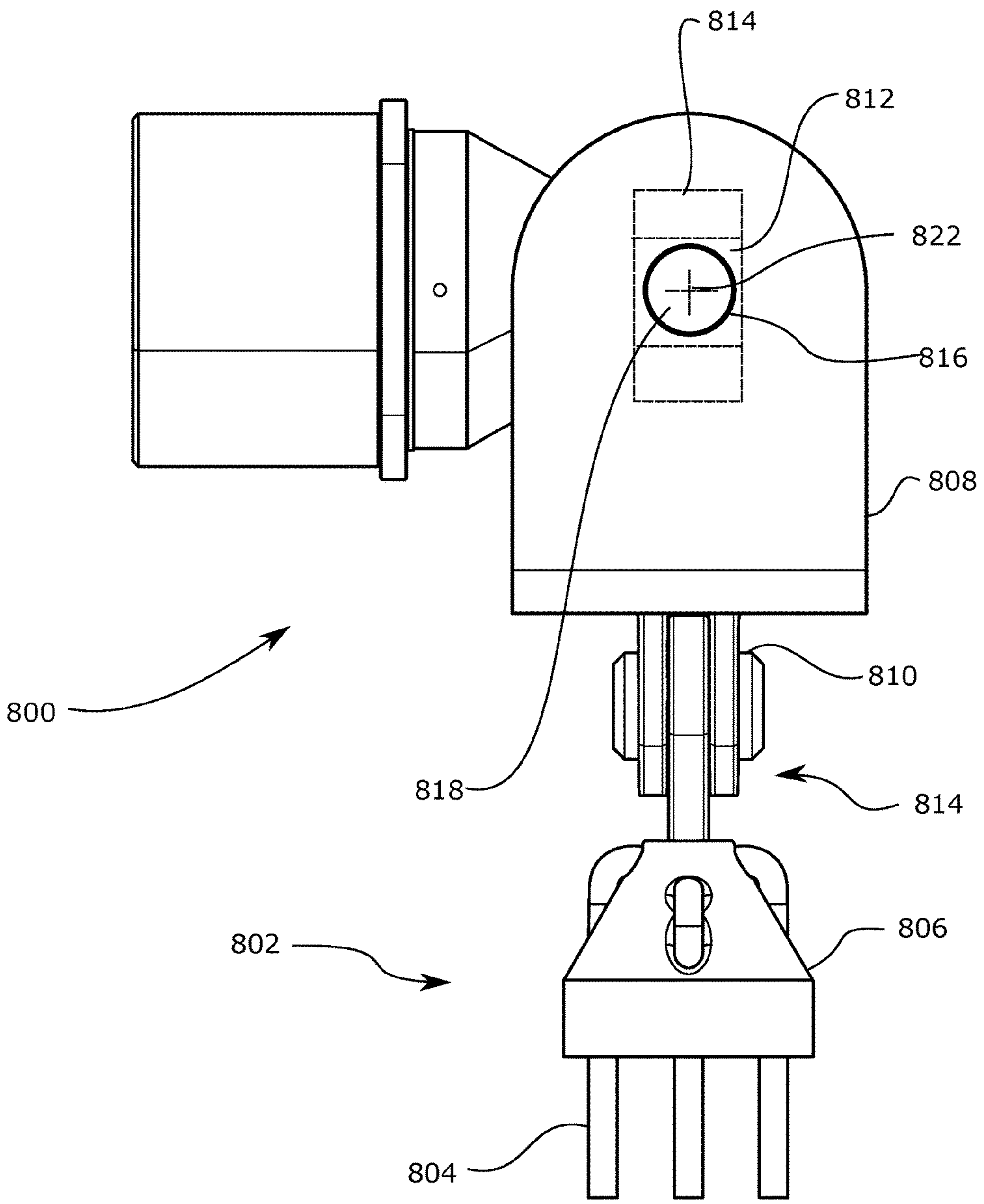
FIG. 8 depicts an embodiment of a flexible tensioning member coupled to a pivot spindle through an alternative pivot joint.

FIG. 8 illustrates another embodiment of a static tensioning assembly 800. This embodiment is similar to the embodiment of FIG. 7, however the flexible tensioning member is formed of a rope assembly 802. The rope assembly 802 has at least one fiber rope 804 comprised of strands of fibers having a specific strength greater than 1,000 kilonewton meter per kilogram and a connection block 806. In this embodiment, a pivot joint 808 has a first connector 810 connected to a top end 814 of the connection block 806 and a second connector 812 connected to a shank 814. The shank 814 has a bore 816 sized and shaped to receive a pivot spindle 818. The first connector 810 enables rotation of rope assembly 802 relative to the pivot joint 808 about a first axis 820 and the second connector 812 enables rotation of the flexile tensioning member 802 relative to the shank 814 about a second axis 822.

Figure 8A:
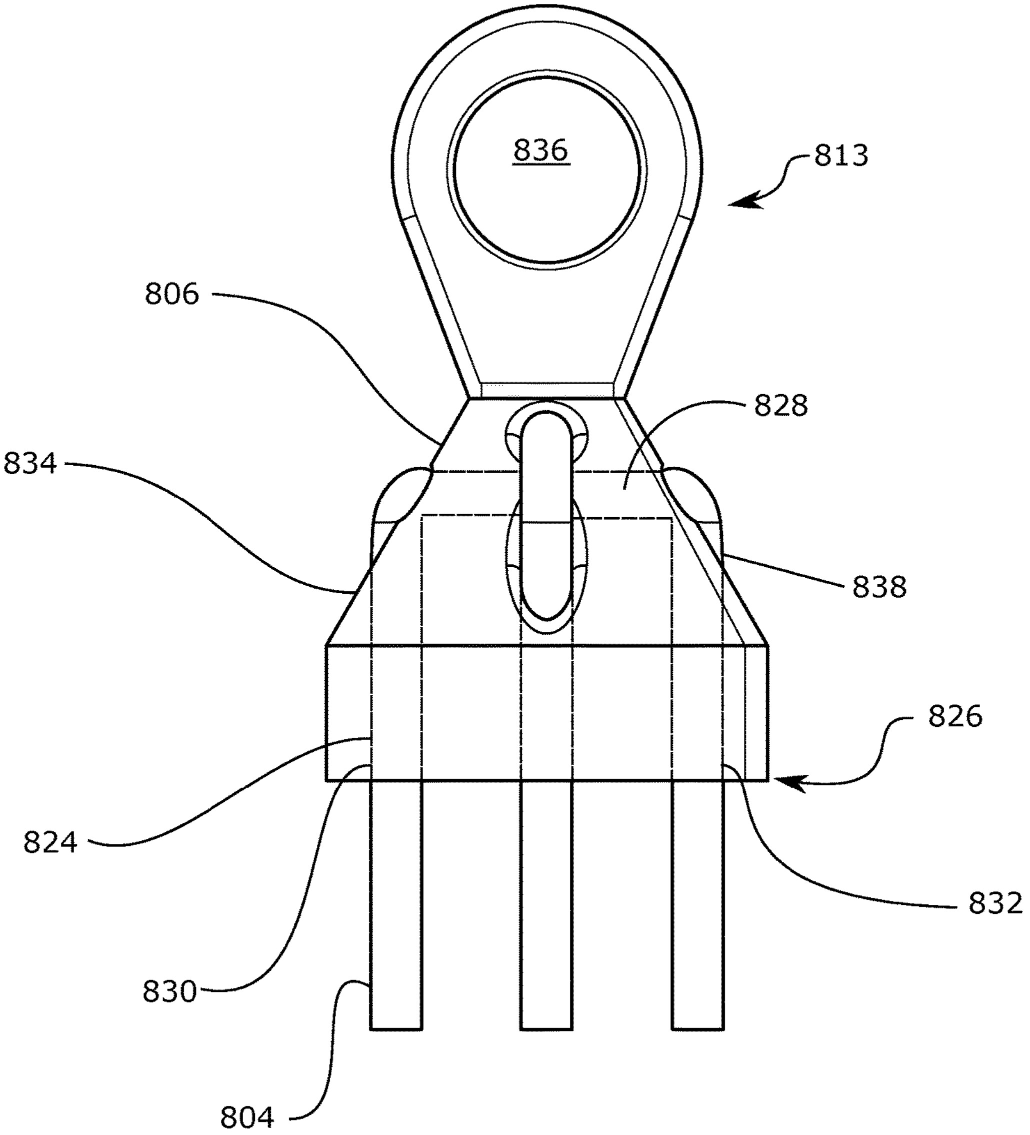
FIG. 8A depicts a rope retainer used in FIG. 8.

FIG. 8A provides a detailed view of the connection block 806 of FIG. 8. The connection block 806 has a plurality of bores 824 that extend longitudinally from a base end 826 towards the top end 813. The plurality of bores 824 are arranged with a horizontal connection between pairs of bores, such that when a rope 804 is threaded into the base end 826 of the connection block through a first bore 830, the rope 804 crosses over into a second bore 832 and exits the base end 826 of the connection block 806 through the second bore 832. In the embodiment of FIG. 8A, the horizontal connection is a lateral bore 828 formed proximate an exit 838 of the first bore 830. A rope 804 is threaded through the first bore 830 until it exits the connection block 806. The rope 804 is then fed into the lateral bore 828 and exits the connection block 806 proximate the second bore 832. The rope 804 then feeds into the second bore 832 until it exits the base end 826 of the connection block 806. Each end of the rope 804 may extend the entire length of the static tensioning assembly 800, or one end of the rope 804 may be tied off near the connection block 806. The connection block 806 of FIG. 8A has two pairs of longitudinal bores, but other numbers of bores are possible.

The connection block 806 may have a tapered cap 834 as shown in FIG. 8A, but other configurations are possible. For example, the connection block 806 could have a flat top with the longitudinal bores exiting the top end 813 of the connection block 806. However, the tapered cap 834 is preferable due to the ease at which it may be threaded by the rope 804. Because the connection block 806 has a connector disposed at it top end 813, such as the eye 836 shown in FIG. 8A, it may be difficult to thread the connection block 806 when it is attached to a pivot joint 808. The tapered cap 834 allows the rope 804 to be threaded in and out of the connection block 806 from a lateral position, rather than an end position that is required if the connection block 806 has a flat top end 813.

Figure 9:
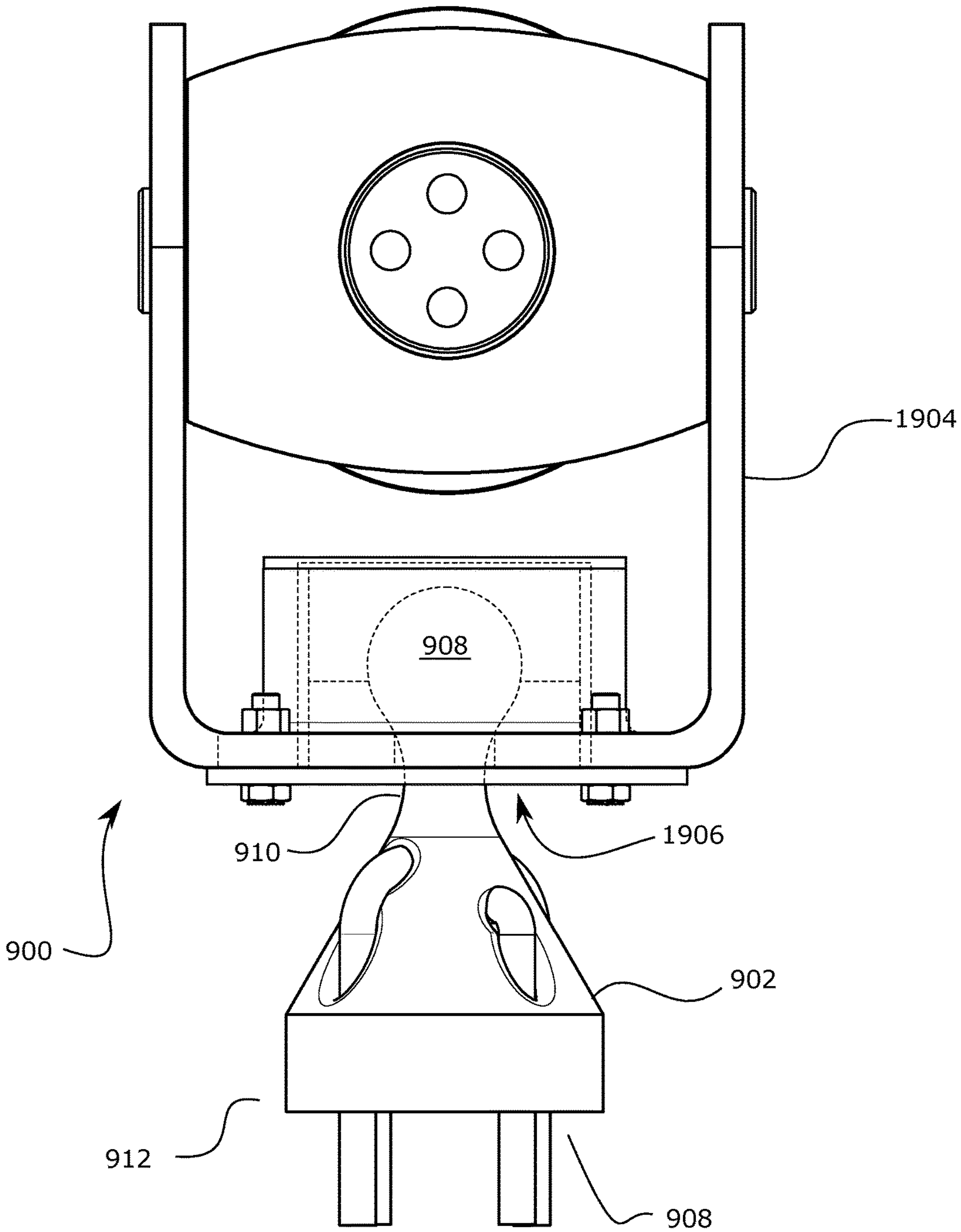
FIG. 9 depicts another embodiment of a flexible tensioning member coupled to pivot spindle through a ball and socket joint.
Figure 10:
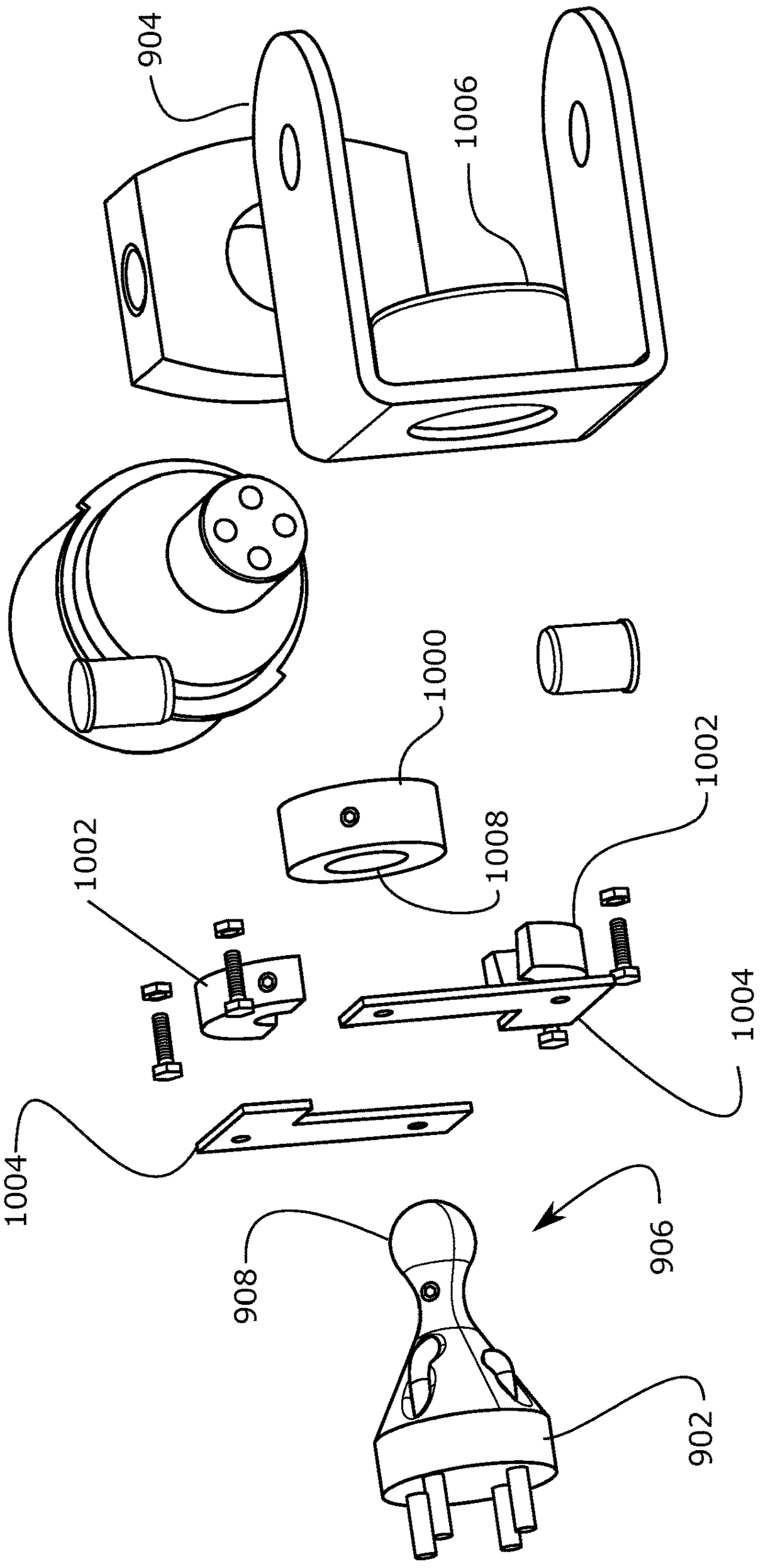
FIG. 10 is an exploded view of the ball and socket joint of FIG. 9.

FIG. 9 illustrates another embodiment of a static tensioning assembly 900. This embodiment is similar to the embodiment of FIG. 8, however the connection between the connection block 902 and the pivot joint 904 differs. In the place of the eye 836, the connection block 902 connects to the pivot joint 904 through a ball joint 906. The connection block 902 has a ball 908 and a shaft 910 disposed opposite a base end 908 of the connection block 902. The ball joint 906 allows rotation of the rope assembly 912 relative to the pivot joint 904 in three different orthogonal axes. FIG. 10 illustrates an exploded view of the embodiment of FIG. 9. The ball joint 906 is comprised of the ball 908 connected to the connection block 902, a calotte 1000, two half calottes 1002, two retainer plates 1004, and a socket 1006. The socket 1006 may be integral to the pivot joint 904, or it may be a separate component that is attached to the pivot joint 904.

The socket 1006 is sized and shaped to receive the calottes 1000, 1002. In the embodiment shown in FIG. 9, the calottes 1000, 1002 are cylindrical but they need not be. For example, the calottes 1000, 1002 could have a square outer shape and the socket 1006 could be a complementary square recess. The ball joint 906 is assembled by placing the calotte 1000 in the socket 1006. The ball 908 is then placed in a recess 1008 of the calotte 1000. The two half calottes 1002 are then placed in the socket 1006 above the ball 908 with the shaft 910 extending between them such that the ball 908 is between the calotte 1000 and the two half calottes 1002. Preferably the calottes 1000, 1002 form a spherical recess that is slightly larger than an outer diameter of the ball 908 and have a combined height matching a depth of the socket 1006. With the calottes 1000, 1002 and ball 908 in place, the retainer plates 1004 are placed over the recess and secured in place. The embodiment of FIG. 9 uses screws 1008 extending through the retainer plates 1004 and into a face of the pivot joint 904 for securement.

Figure 23:
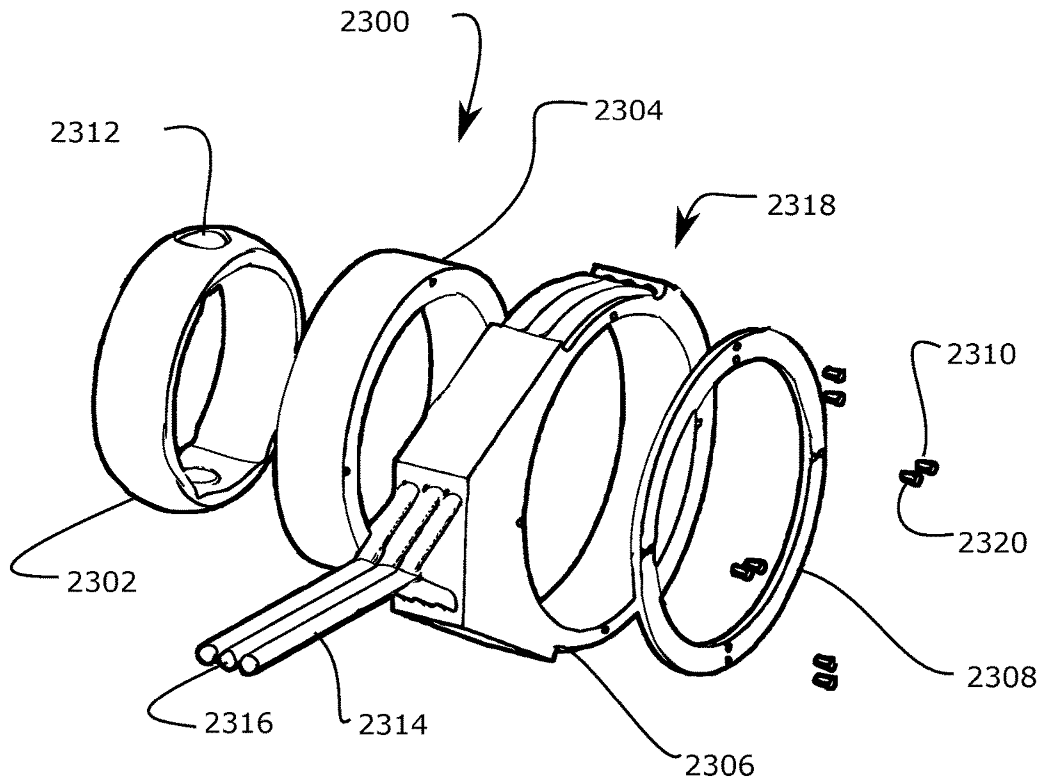
FIG. 23 illustrates an exploded view of another embodiment of a connection block.

FIG. 23 illustrates another embodiment of a static tensioning assembly 2300. The static tensioning assembly 2300 includes a rope assembly 2314 has at least one fiber rope 2316 comprised of strands of fibers having a specific strength greater than 1,000 kilonewton meter per kilogram and a connection block 2318 connection block having an inner ring 2302, an outer ring 2304, a cover 2306, and a bracket 2308. The inner ring 2302 is fixed to mounting location on a crane, such as a pivot joint at the foot of a boom. The inner ring 2302 may slide over the mounting location and then be secured using a pin passing through apertures 2312 in the inner ring 2302. An outer ring 2304 is secured over the inner ring 2302 and is configured to rotate about the inner ring 2302. The inner ring may have a spherical outer surface and the outer ring may have a complementary inner surface, so that together the inner ring and the outer ring form a spherical joint.

A cover 2306 having circumferential grooves is disposed around the outer ring 2304. The circumferential grooves are sized and shaped to receive the rope assembly 2314 which encompasses the cover 2306. The cover is secured to the outer ring by the bracket 2308 which attached to the cover through bolts 2310 and to the inner cover through bolts 2320.

Figure 24:
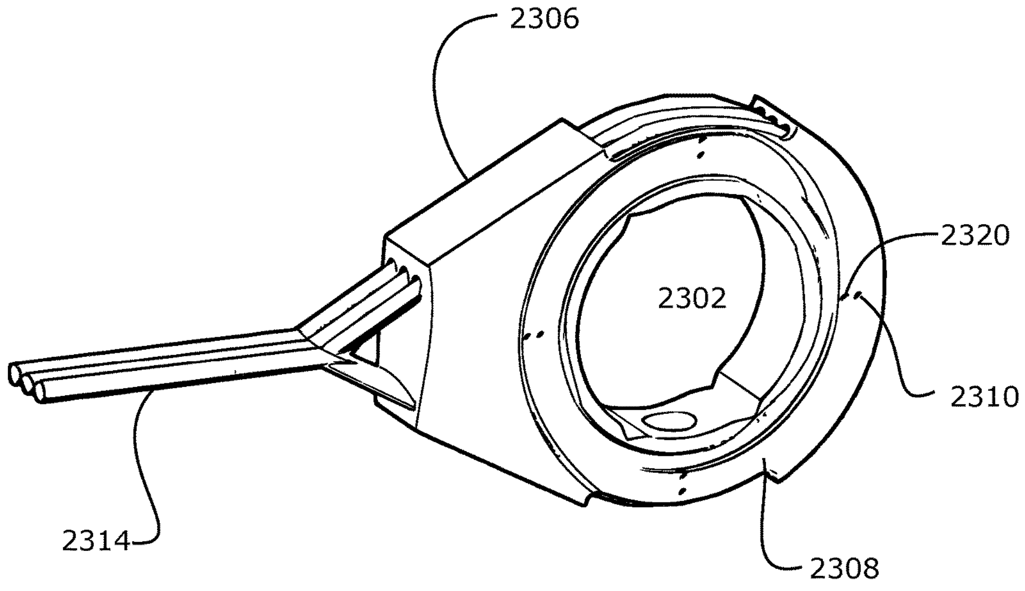
FIG. 24 illustrates the connection block of FIG. 23 in an assembled view.

FIG. 24 illustrates the static tensioning assembly of FIG. 23 in an assembled configuration. In one application, the inner surface of the inner ring is positioned over a pivot joint at the foot of the boom, and the rope assembly 2314 is connected to a crane component at an opposite end (not shown). In operation, the rope assembly is able to provide tension between the pivot joint and the crane component, but does not twist as the component moves due to the spherical joint, which allows for three degrees of freedom.

Figure 11:
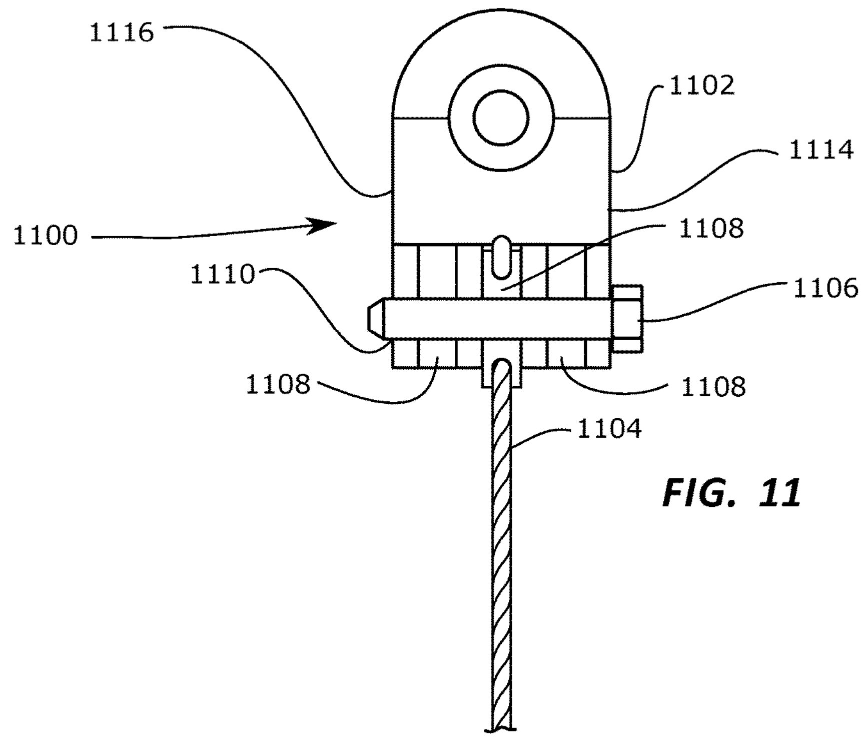
FIG. 11 is an embodiment of a static tensioning assembly having a single flexible tensioning member.

FIG. 11 illustrates an embodiment of one end of a crane tensioning assembly 1100. The crane tensioning assembly 1100 comprises a connection block 1102, a tensioning member 1104, and a pin 1106.

The connection block 1102 has a plurality of cavities 1108 with each cavity sized and shaped to receive an end of a tensioning member 1104. The connection block 1102 has a bore 1110 that extends through a first cavity 1112 from among the plurality of cavities 1108. The bore 1110 may extend from one lateral side 1114 of the connection block 1102 through the other lateral side 1116 of the connection block 1102, or the bore 1110 may extend partially through the connection block 1102.

Figure 12:
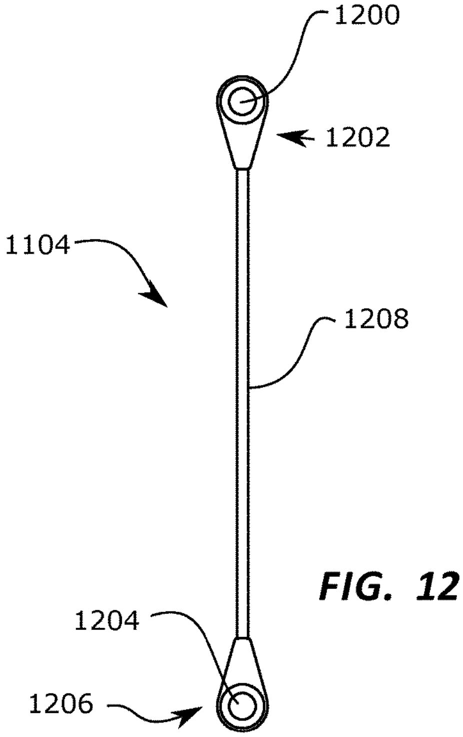
FIG. 12 is an embodiment of a flexible tensioning member for use in the assembly of FIG. 11.

FIG. 12 illustrates an exemplary tensioning member 1104. The tensioning member 1104 has an eye 1200 disposed at a first end 1202 and may additionally have an eye 1204 disposed at an opposite end 1206 of the tensioning member. Between the eyes 1200, 1204 is a body 1208 formed of fibers having a specific tensile strength greater than 1000 kilonewton meters per kilogram. In some embodiments the tensioning member 1104 may be the flexible support member 200 shown in FIG. 2. In other embodiments the tensioning member 1104 may be a rope having an eye. In use, the tensioning member 1104 is disposed within a cavity from among the plurality of cavities 1108 such that the eye 1200 has a centerline coaxial with a centerline of the bore 1110 extending through the cavity.

The pin 1106 is disposed in the bore 1110 and extends into a cavity and through the eye 1200 of the tensioning member 1104, fixing the tensioning member 1104 in place. The pin 1106 may be a clevis pin, having an enlarged head preventing the pin 1106 from passing completely through the bore 1110 and a cotter pin preventing the pin 1106 from being removed from the bore 1110. In some embodiments the bore 1110 may have a threaded portion and the pin 1106 may be a bolt passing through the cavities and threaded into the threaded portion of the bore 1110. In other embodiments the pin 1106 may have a retaining clip preventing the pin 1106 from being removed from the bore 1110.

Figure 13:
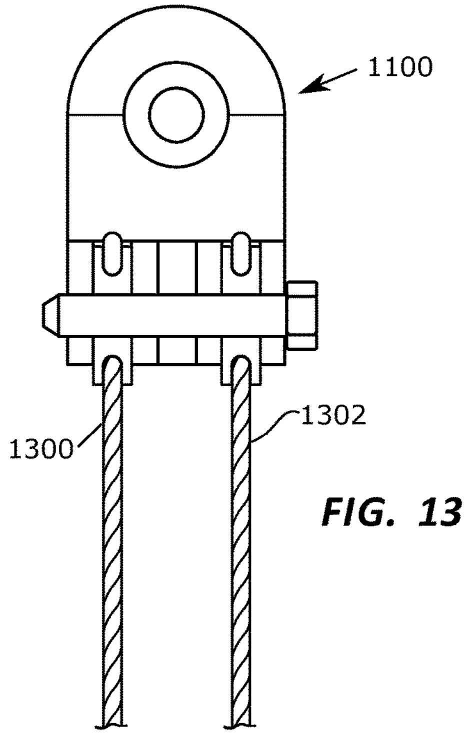
FIG. 13 is an embodiment of the flexible tensioning member of FIG. 11 with two flexible tensioning members.
Figure 14:
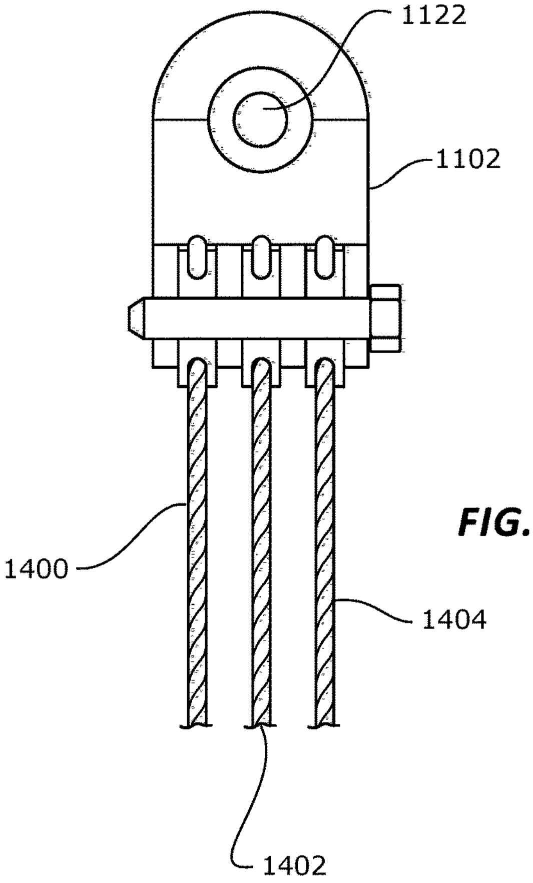
FIG. 14 is an embodiment of the static tensioning assembly of FIG. 11 with three flexible tensioning members.
Figure 15:
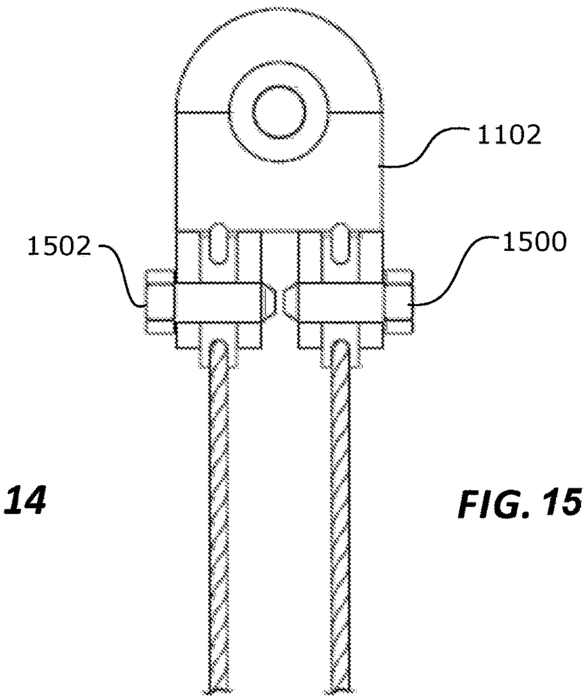
FIG. 15 is an embodiment of the static tensioning assembly of FIG. 11 with two flexible tensioning members and two pins.

In embodiments in which the bore 1110 extends through more than one cavity, the pin 1106 may extend through more than one cavity such that the pin is able to fix more than one tensioning member 1104 in place. FIG. 13 illustrates the crane tensioning assembly of FIG. 11, but with a first tensioning member 1300 and a second tensioning member 1302 in place of the single tensioning member 1104 of FIG. 11. The pin 1106 extends through the eye 1200 of the first and second tensioning member 1300, 1302 such that the single pin 1106 secures both tensioning members. FIG. 14 illustrates the connection block of FIG. 11, but with three tensioning members 1400, 1402, 1404. The pin 1106 extends through the eyes 1200 of all three tensioning members. FIG. 15 illustrates the connection block 1102 of FIG. 13, but with a separate pin 1500, 1502 securing each of the first tensioning member 1300 and the second tensioning member 1302.

The connection block 1102 may have a second bore 1122 that does not extend through any of the plurality of cavities 1108. The second bore 1122 may be sized and shaped to receive a pivot spindle. In some embodiments, the connection block 1102 may have a ball disposed opposite the plurality of cavities. The ball may be used in the ball and socket joint described in relation to FIG. 9.

Figure 16:
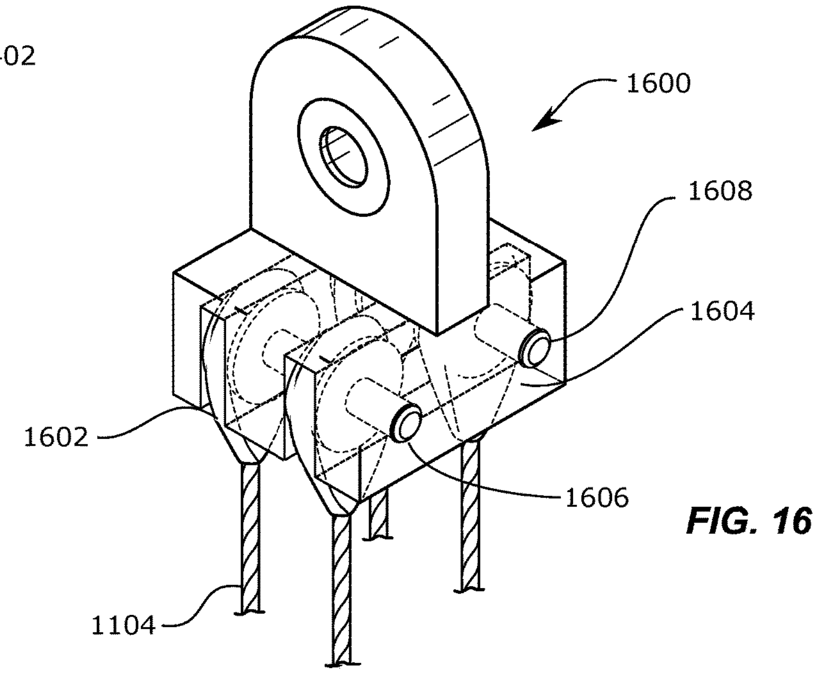
FIG. 16 is an embodiment of a flexible tensioning member having more than one row of cavities.

FIG. 16 illustrates another embodiment of a connection block 1600. The connection block 1600 has a first plurality of cavities 1602 sized and shaped to receive an end of a tensioning member 1104 and a second plurality of cavities 1604 sized and shaped to receive an end of a tensioning member 1104. A first bore 1606 extends through the first plurality of cavities 1602 and a second bore 1608 parallel to the first bore 1606 extends through the second plurality of cavities 1604. The second plurality of cavities 1604 may be the same size and shape as the first plurality of cavities 1604, or in some embodiments they may be sized and shaped to receive a different size of tensioning members. In the embodiment of FIG. 16 a first pin (not shown) secures the tensioning members 1104 in the first plurality of cavities 1602 and a second pin (not shown) secures tensioning members 1104 in the second plurality of cavities 1604.

Figure 21:
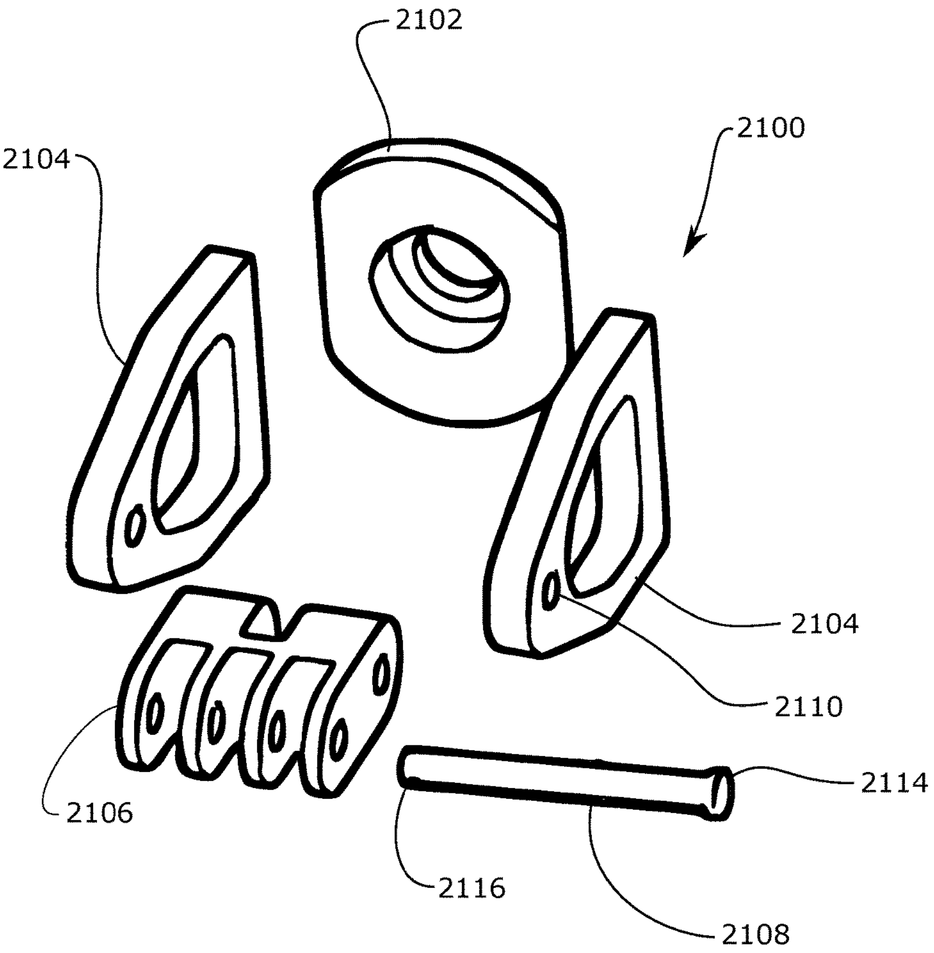
FIG. 21 illustrates an exploded view of an embodiment of a connection block.

FIG. 21 illustrates an exploded view of another embodiment of a connection block 2100. The connection block 2100 has a plate 2102 with two arms 2104 extending from the plate 2102. The plate 2102 acts as a rotating connection between an existing pivot point on a crane and the connection block 2100. Each arm 2104 may be formed as an individual component as shown in FIG. 21, or may be a single piece integral with the plate 2102. A clevis 2106 is disposed between the two arms 2104 and a pin 2108 secures the clevis 2106 in place. Each arm 2104 has an aperture 2110 sized and shaped to receive the pin 2108. The clevis 2106 has an aperture 2112 that is aligned with the arm aperture 2110 and the pin 2108 is inserted through the aperture 2110 of the arm 2104 and through the aperture 2112 of the clevis 2106. A first end of the pin 2108 has an enlarged portion 2114 that prevents the pin 2108 from passing completely through the aperture 2110, and the other side of the pin 2108 has an aperture 2116 for receiving a locking pin. With the locking pin inserted in the pin 2108, the pin 2108 is unable to be removed from the apertures 2110, 2112 due to interference between the locking pin and the arm 2104.

Figure 22:
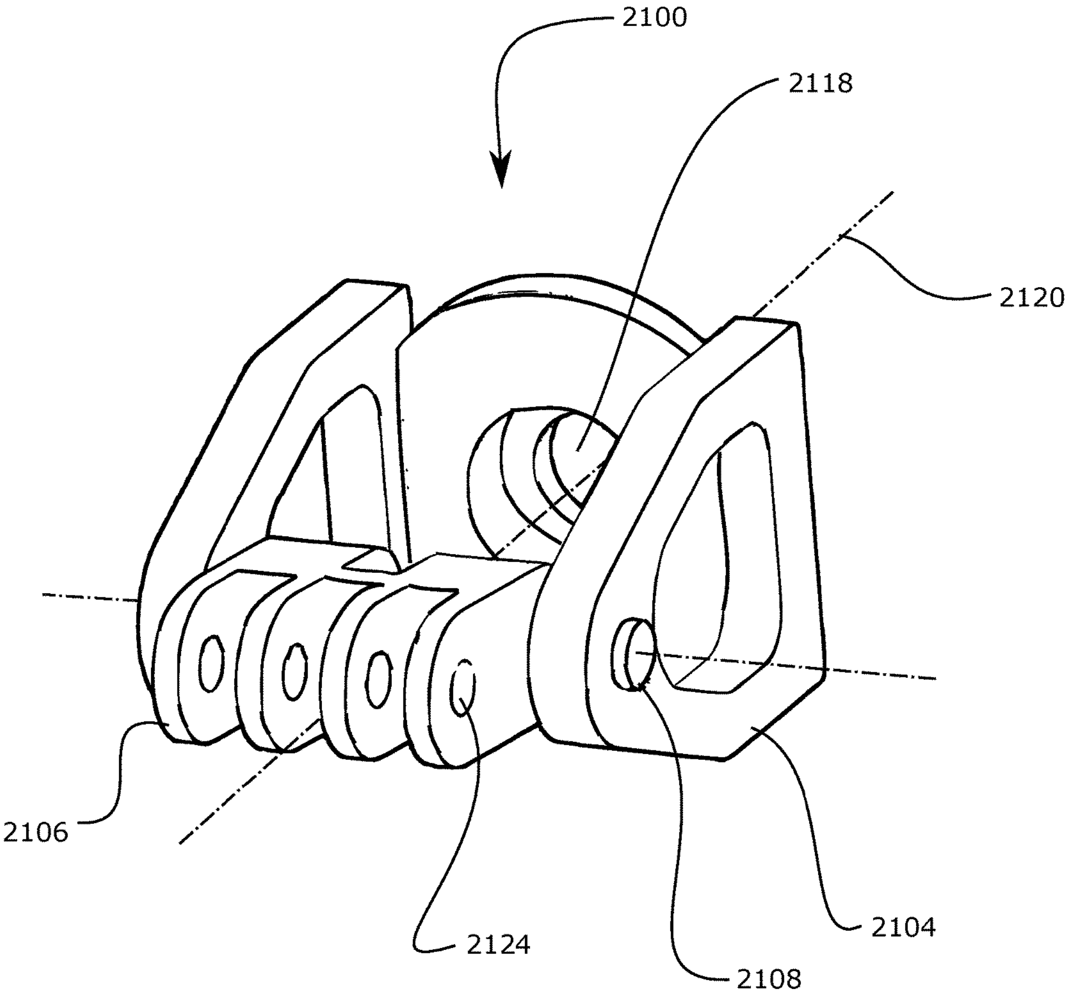
FIG. 22 illustrates the connection block of FIG. 21 in an assembled view.

FIG. 22 illustrates the connection block 2100 of FIG. 21 in an assembled state. An aperture 2118 in the plate 2102 provides a rotating connection to a point on a crane enabling rotation about a first axis 2120. The clevis 2106 is connected to the arms 2104 and is free to rotate about a second axis 2122 that perpendicular to the first axis 2120 allowing two degrees of freedom. A flexible tensioning member such as those described in relation to FIG. 7, may have an eye 1200 placed in the clevis 2106 and a second pin is inserted through a second aperture 2124 in the clevis 2106, securing the flexible tensioning member in place.

Figure 25:
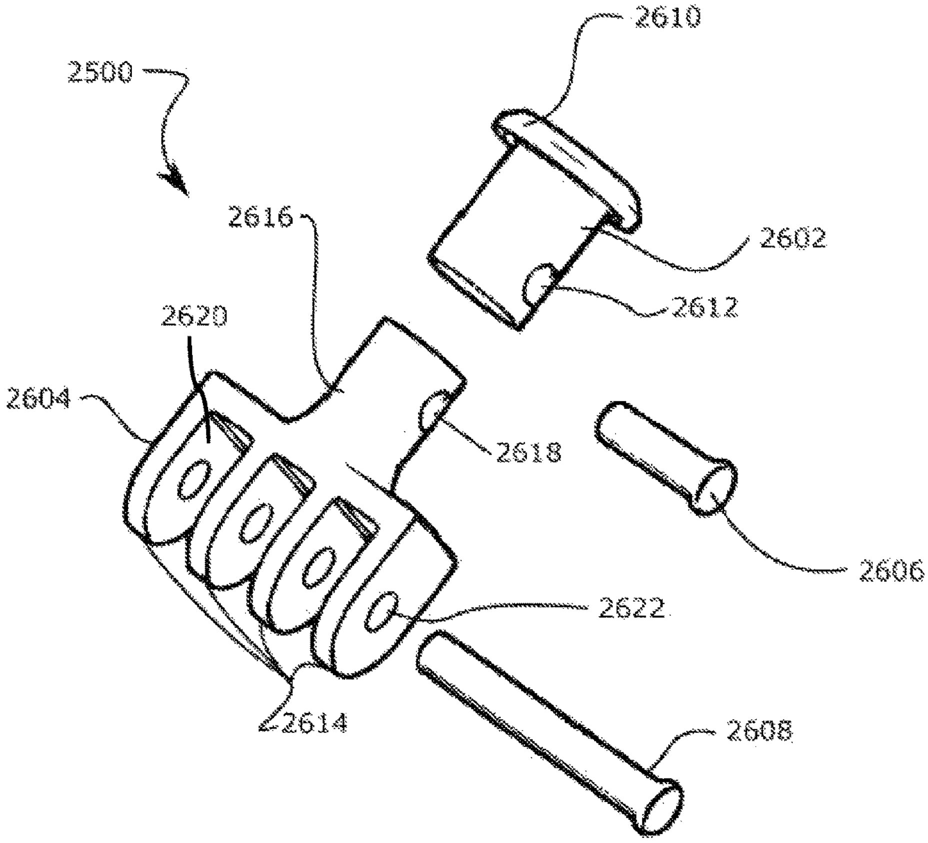
FIG. 25 illustrates an exploded view of another embodiment of a connection block.

FIG. 25 illustrates another embodiment of a connection block 2500. This connection block 2500 has a base 2602, a clevis 2604, a small pin 2606, and a large pin 2608. The base 2602 is configured to be inserted through an aperture of a plate on a crane with an enlarged portion 2610 preventing the base 2602 from passing through the plate. The enlarged portion 2610 may have a bearing between it and the plate, allowing the base 2602 to rotate relative to the plate. In other embodiments, a bearing may be internal to the base 2602 such that a portion of the base 2602 may rotate relative to the remainder of the base 2602. Opposite the enlarged portion 2610, the base 2602 has an aperture 2612 passing through the base 2602. The aperture 2612 is sized and shaped to receive a pin. The base 2602 may also have a recessed portion sized and shaped to receive a portion of the clevis 2604. In other embodiments, the clevis 2604 may have a recess sized and shaped to receive a portion of the base 2602.

The clevis 2604 has a plurality of arms 2614 on one side and an extended portion 2616 for connection to the base 2602. The extended portion 2616 may be inserted into the recess of the base 2602 aligning the aperture 2612 of the base with an aperture 2618 of the clevis 2604, or in other embodiments the extended portion 2616 may receive a portion of the base 2602 aligning the aperture 2618 of the clevis with the aperture 2612 of the base. The small pin 2606 is then inserted through the apertures 2612, 2618, securing the base 2602 to the clevis 2604. The plurality of arms 2614 of the clevis 2604 form a series of recesses 2620 sized and shaped to receive a tensioning member, such as those described previously. A second aperture 2622 passes through the arms 2614 such that when an eye of a tensioning member is positioned in the recess 2620, the large pin 2608 may be inserted through the recesses and the eye, securing the tensioning member in the recess 2620.

Figure 26:
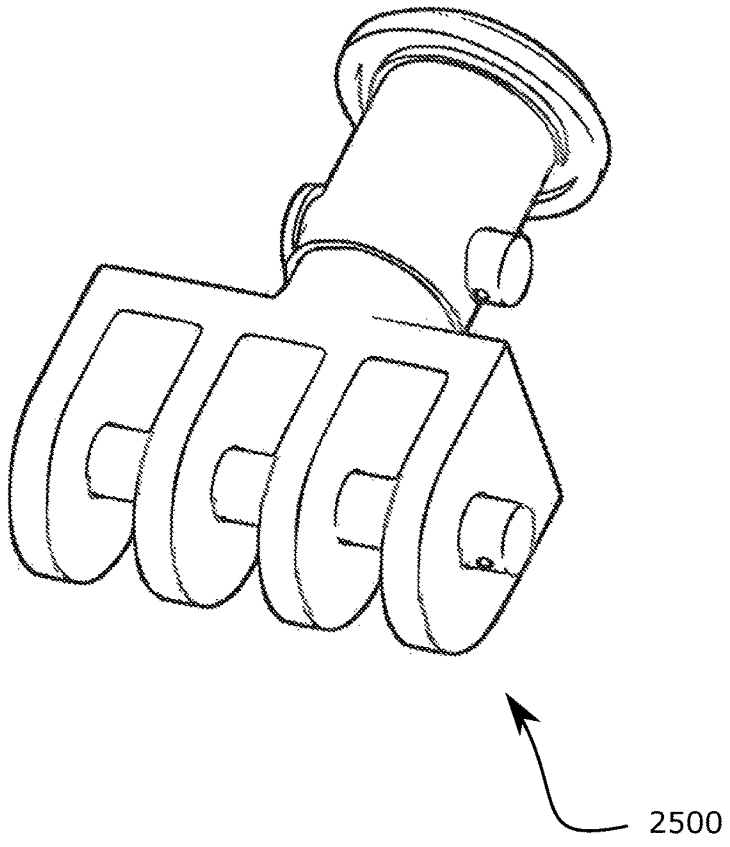
FIG. 26 illustrates the connection block of FIG. 25 in an assembled view.

FIG. 26 illustrates the connection block 2500 in an assembled configuration. In use, the connection block 200 may be used with an existing pivot joint, such as the pivot joint shown in FIGS. 8 and 9. The connection block 2500 may replace connection block 806 or connection block 902. In one embodiment, the connection block 2500 may be used at a pivot joint at a foot of a boom. The connection block 2500 provides an additional degree of freedom preventing torsional stress of the tensioning member.

Figure 20:
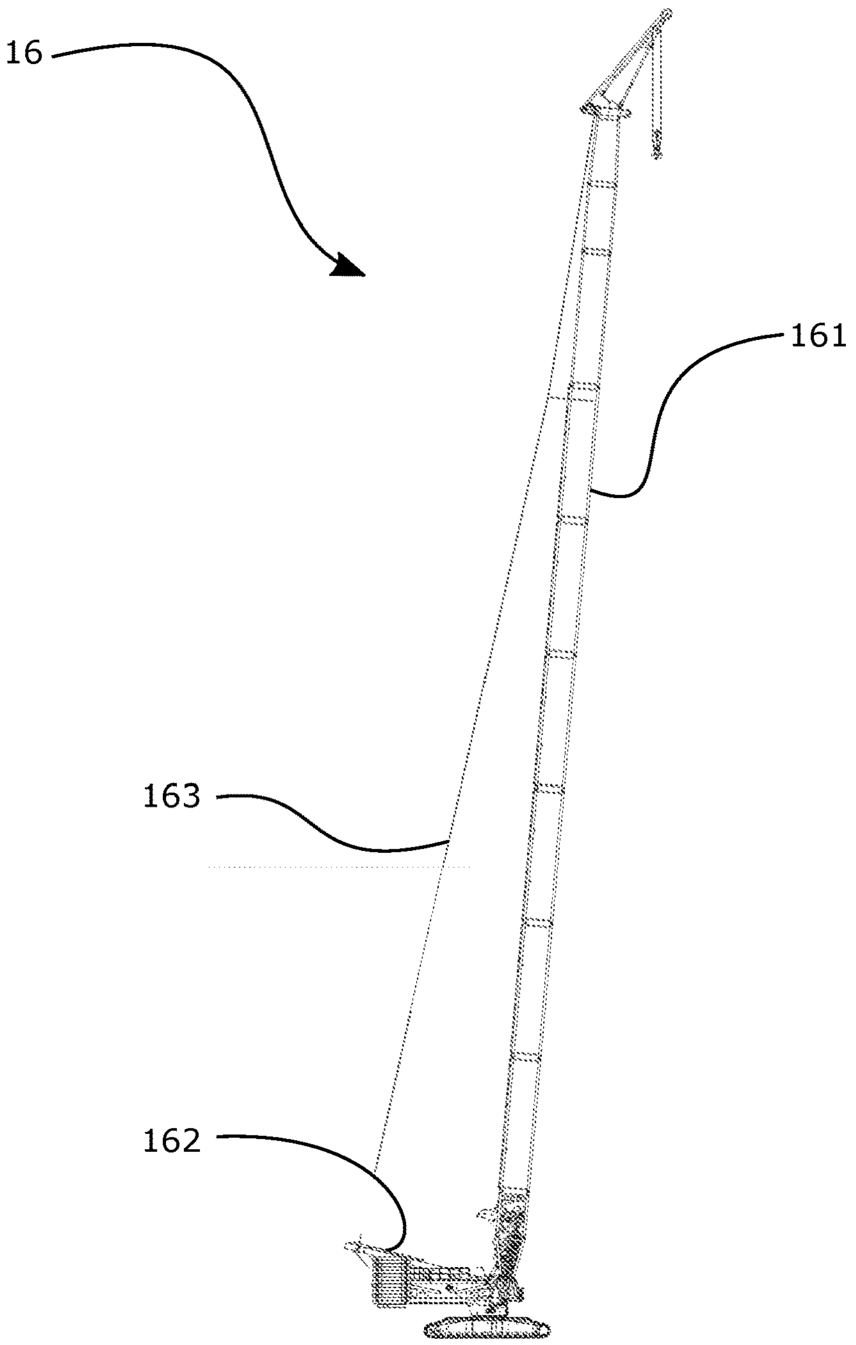
FIG. 20 illustrates a schematic of a crawler type crane.

FIG. 20 illustrates a schematic of a crawler type crane 16. The crane 16 has a lattice boom 161 formed of multiple sections. A mast 162 extends laterally from the boom 161 and is connected directly to a first end of the boom 161. The mast 162 is connected to a second end of the boom 161 through a system of flexible tensioning members 163. The flexible tensioning members 163 provide additional support to the second end of the boom 161 and may effect movement of the boom 161. Because of the extended length of the boom 161, many flexible tensioning members 163 may be joined end to end to span the distance between the mast 162 and the second end of the boom 161. Multiple flexible tensioning members 163 may also be used in parallel to increase the load capacity of the system of flexible tensioning members 163.

Figure 17:
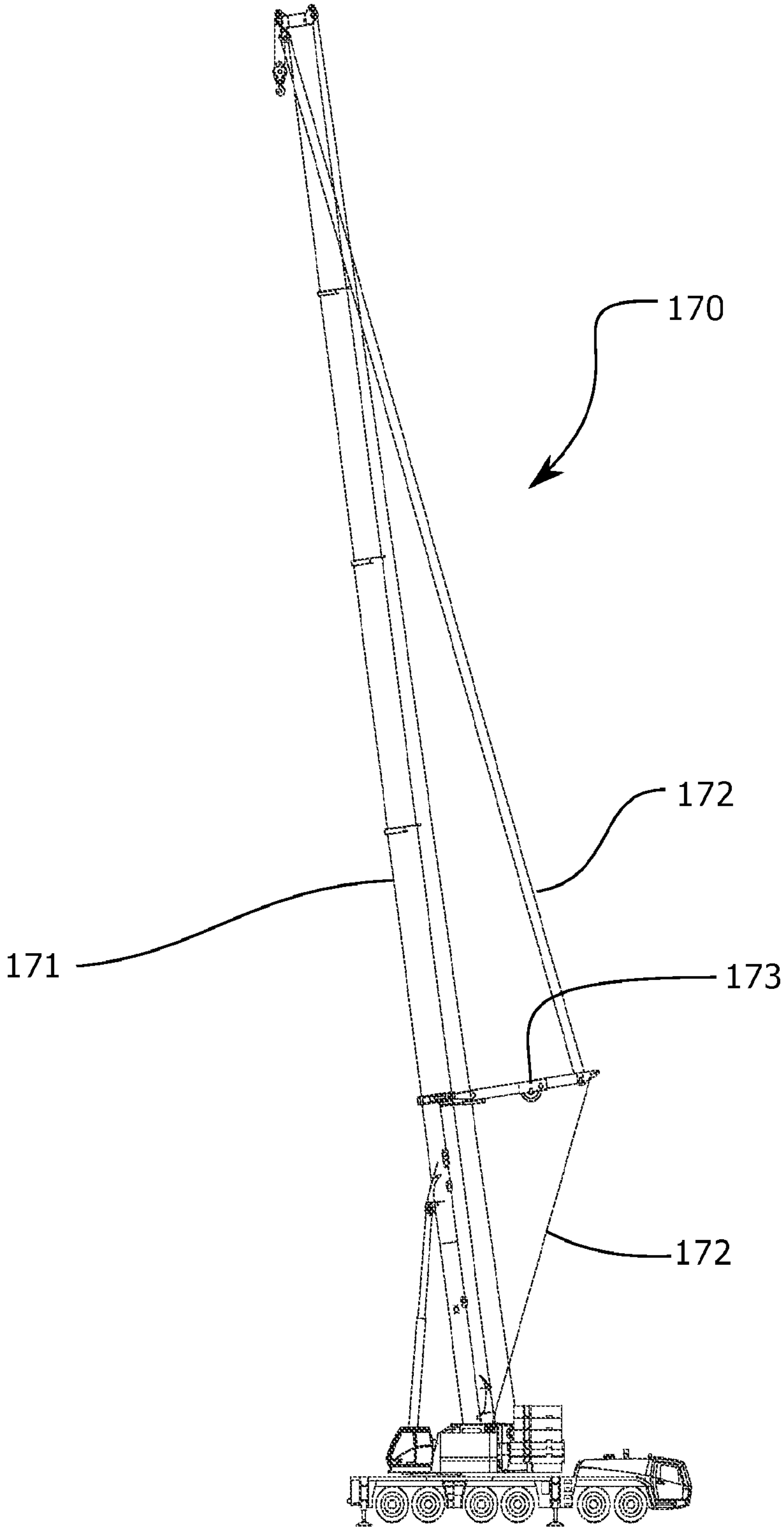
FIG. 17 illustrates a schematic of a mobile crane.

FIG. 17 illustrates a schematic of a mobile crane 170. The mobile crane 170 has a telescoping boom 171 that is supported by system of flexible tensioning members 172. A mast 173 extends laterally from the boom 171 to offset the flexible tensioning members 172 from the boom 171. During setup, the mast 173 may pivot about the boom 171, requiring the flexible tensioning member 172 to pivot as well. As described previously, the tensioning members 172 are designed with an attachment to the mast 173 that allows for rotation and movement of the flexible tensioning member 172 relative to the mast 173.

Figure 18:
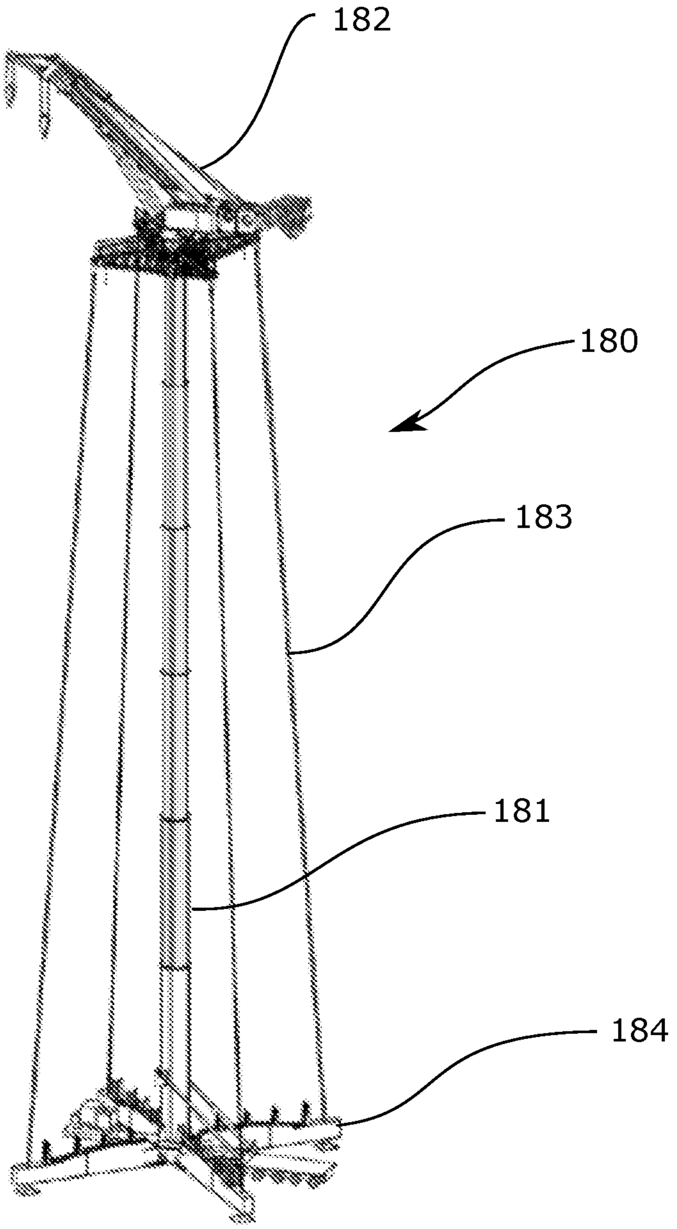
FIG. 18 illustrates a schematic of a mobile platform crane.

FIG. 18 illustrates a schematic of a mobile platform crane 180. The crane 180 has a telescoping column 181 with a boom assembly 182 disposed on the end of the telescoping column 181. The telescoping column 181 is supported through the use of flexible tensioning members 183 that extend from the boom assembly 182 to outriggers 184 at the base of the crane 180. The flexible tensioning members 183 may be joined end to end to span the distance between the outriggers 182 and the boom assembly 182.

Figure 19:
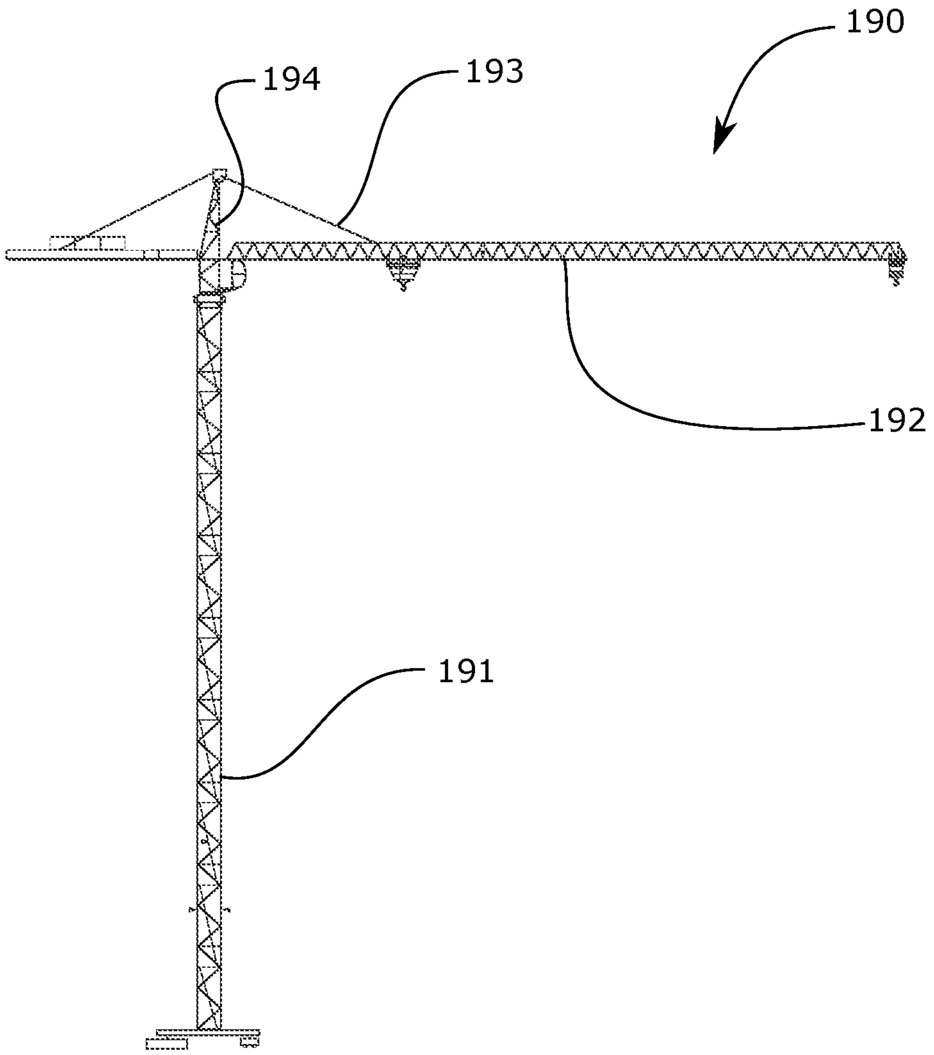
FIG. 19 illustrates a schematic of a tower crane 190.

FIG. 19 illustrates a schematic of a tower crane 190. The tower crane 190 has a lattice tower 191 with a boom 192 disposed on the top of the lattice tower 190. To support the boom 192, flexible tensioning members 193 are to connect a mast 194 to the boom 192.

The previously described embodiments of tensioning members, tensioning systems, and connection blocks may be used in the cranes described in FIGS. 17 through 20. For example, flexible tensioning member 200 may be used as tensioning members 163, 172, 183, and 193. Because flexible tensioning member 200 is of lighter weight than a similar steel tensioning member, fewer tensioning members are necessary than if steel tensioning members were used. Furthermore, the described connection block and static tensioning assembly may be used to connect the flexible tensioning member 200 to the mast and boom of the described cranes.

The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A flexible tensioning member comprising:

a) a middle portion comprising a bundle of fibers having a specific tensile strength greater than 1,000 kilonewton meter per kilogram;

b) a first end connected to the middle portion, the first end having a first connector including a first bushing; and c) a second end connected to the middle portion, the second end comprising a first member extending axially and laterally from the middle portion and a second member extending axially and laterally from the middle portion and laterally from the first member, the first member having a second connector including a second bushing and the second member having a third connector including a third bushing, wherein the bundle of fibers is wrapped around the first bushing, the second bushing the third bushing.

2. The flexible tensioning member of claim 1 further comprising a spacer disposed between the second connector and the third connector.

3. The flexible tensioning member of claim 1 further comprising a cut resistant protective jacket covering a portion of the second end.

4. The flexible tensioning member of claim 3 wherein the jacket comprises a layer of aramid fibers and a layer of polyurethane.

5. The flexible tensioning member of claim 1 wherein the first end comprises a third member extending axially and laterally from the middle portion and a fourth member extending axially and laterally from the middle portion and laterally from the third member, the third member having the first connector and the fourth member having a fourth connector.

6. A combination of the flexible tensioning member of claim 1 and a cross pin disposed between the first member and the second member, the cross pin having a first pin end and a second pin end, wherein the second connector is sized and shaped to receive the first pin end and the third connector is sized and shaped to receive the second pin end.

7. The combination of claim 6 wherein the cross pin has a bore disposed between the first pin end and the second pin end, the bore sized and shaped to receive a pivot spindle.

8. The flexible tensioning member of claim 1 wherein the fibers comprise poly(p-phenylene-2,6-benzobisoxazole).

9. A flexible tensioning member comprising:

a) a middle portion comprising a bundle of fibers having a specific tensile strength greater than 1,000 kilonewton meter per kilogram;

b) a first end connected to the middle portion, the first end having a first connector;

a second end connected to the middle portion, the second end comprising a first member extending axially and laterally from the middle portion and a second member extending axially and laterally from the middle portion and laterally from the first member, the first member having a second connector and the second member having a third connector; and d) a cut resistant protective jacket covering a portion of the second end, wherein the cut resistant protective jacket biases the second connector towards the third connector.

10. A crane static tensioning assembly comprising:

a) a flexible tensioning member comprising fibers having a specific tensile strength greater than 1,000 kilonewton meter per kilogram;

b) a shank having a bore shaped and sized to receive a pivot spindle; and c) a pivot joint having a first connector coupled to the flexible tensioning member and a second connector coupled to the shank, wherein the second connector is rotatably connected to the shank.

11. The crane static tensioning assembly of claim 10 wherein the flexible tensioning member comprises a rope comprised of the fibers.

12. The crane static tensioning assembly of claim 10 wherein the first connector enables rotation of the flexible tensioning member relative to the pivot joint about a first axis, a second axis perpendicular to the first axis, and a third axis perpendicular to the first axis and the second axis.

13. The crane static tensioning assembly of claim 12 wherein the first connector comprises a ball and socket joint.

14. The crane static tensioning assembly of claim 12 wherein the flexible tensioning member further comprises a connection block having a plurality of longitudinal bores with the rope disposed in at least two of said bores.

15. A crane static tensioning assembly comprising:

a) a flexible tensioning member comprising fibers having a specific tensile strength greater than 1,000 kilonewton meter per kilogram;

b) a shank having a bore shaped and sized to receive a pivot spindle; and c) a pivot joint having a first connector coupled to the flexible tensioning member and a second connector coupled to the shank, wherein the first connector enables rotation of the flexible tensioning member relative to the pivot joint about a first axis and the second connector enables rotation of the flexible tensioning member about a second axis orthogonal to the first axis.

16. The crane static tensioning assembly of claim 15 wherein the flexible tensioning member comprises a middle portion and an end connected to the middle portion, the end comprising a first member extending axially and laterally from the middle portion and a second member extending axially and laterally from the middle portion and laterally from the first member, the first member and second member fastened to the pivot joint.

17. A crane comprising:

a) a boom;

b) a mast coupled to the boom at a first end of the mast; and c) a flexible tensioning member comprising:

i) a middle portion comprising a bundle of fibers having a specific tensile strength greater than 1,000 kilonewton meter per kilogram;

ii) a first end connected to the middle portion, the first end having a first connector; and iii) a second end connected to the middle portion, the second end comprising a first member extending axially and laterally from the middle portion and a second member extending axially and laterally from the middle portion and laterally from the first member, the first member having a second connector and the second member having a third connector.

18. A crane comprising:

a) a boom;

b) a mast coupled to the boom at a first end of the mast; and c) a flexible tensioning member comprising:

i) fibers having a specific tensile strength greater than 1,000 kilonewton meter per kilogram;

ii) a shank having a bore shaped and sized to receive a pivot spindle; and iii) a pivot joint having a first connector coupled to the flexible tensioning member and a second connector coupled to the shank.

19. A crane static tensioning assembly comprising:

a) a flexible tensioning member comprising fibers having a specific tensile strength greater than 1,000 kilonewton meter per kilogram and an eye formed at least at one end; and b) a pivot member connected to the eye at the end of the flexible tensioning member, wherein the pivot member includes first and second pivot joints having respective first and second axes of rotation about each of which the flexible tensioning member is configured to rotate, the first pivot joint comprising a pin extending into the eye and the second pivot joint comprising a bore and a pivot spindle received in the bore.

* * * * *